(12) United States Patent
Katao

(10) Patent No.: US 6,968,561 B2
(45) Date of Patent: Nov. 22, 2005

(54) OPTICAL LIBRARY AND OPTICAL STORAGE SYSTEM

(76) Inventor: Hisashi Katao, 5940-2 Hino, Hino-shi, Tokyo (JP)

( * ) Notice: Subject to any disclaimer, the term of this patent is extended or adjusted under 35 U.S.C. 154(b) by 19 days.

(21) Appl. No.: 10/607,720

(22) Filed: Jun. 27, 2003

(65) Prior Publication Data

US 2004/0090880 A1 May 13, 2004

Related U.S. Application Data

(62) Division of application No. 09/528,815, filed on Mar. 20, 2000, now Pat. No. 6,614,751.

(30) Foreign Application Priority Data

| Mar. 18, 1999 | (JP) | ............................................. | 11-113997 |
| Jun. 21, 1999 | (JP) | ............................................. | 11-209627 |
| Jun. 21, 1999 | (JP) | ............................................. | 11-209628 |

(51) Int. Cl.[7] .......................... G11B 7/085; G11B 21/02; G11B 23/03
(52) U.S. Cl. .................. 720/639; 369/30.42; 369/30.43
(58) Field of Search ................................ 369/77.2, 273, 369/289, 290, 291, 44.19, 300, 30.4, 30.41, 30.42, 30.43, 30.46, 30.38; 720/630, 632, 633, 636, 637, 639, 641, 657, 725, 728, 736

(56) References Cited

U.S. PATENT DOCUMENTS

| 5,140,478 A | * | 8/1992 | Yoshida .................... 360/97.01 |
| 5,218,503 A | | 6/1993 | Martin |
| 5,235,481 A | * | 8/1993 | Kamo et al. ................. 360/133 |
| 5,325,349 A | * | 6/1994 | Taniguchi ................. 369/44.19 |
| 5,381,402 A | | 1/1995 | Lee |
| 5,412,522 A | * | 5/1995 | Lockhart et al. .......... 360/97.01 |
| 5,432,763 A | * | 7/1995 | Campbell et al. ....... 369/112.24 |
| 6,081,499 A | * | 6/2000 | Berger et al. ............ 360/77.03 |
| 6,307,832 B1 | * | 10/2001 | Novotny et al. .......... 369/13.33 |

FOREIGN PATENT DOCUMENTS

| JP | 62-022248 | 1/1987 |
| JP | 05-067382 | 3/1993 |
| JP | 5-189861 | 7/1993 |
| JP | 05-266495 | 10/1993 |

* cited by examiner

*Primary Examiner*—David L. Ometz
(74) *Attorney, Agent, or Firm*—Brenda O. Holmes; Kilpatrick Stockton LLP

(57) ABSTRACT

At least an optical disk, a spindle motor, an optical head assembly and a seeking mechanism are mounted in a disk cartridge to accordingly establish a hermetically sealed structure. On the other hand, a disk cartridge guide member, an optical assembly, a disk cartridge lock mechanism, and an optical path switching mechanism are mounted in an optical disk drive. This enables the structure of improving the dust immunity of the disk cartridge and the low cost. Moreover, the optical disk drive can accommodate a plurality of disk cartridges. Thus, a disk cartridge implements a memory corresponding to various services. Or, an optical library of the present invention has mechanisms for mounting and detaching the optical disk cartridge accordingly accommodating a large number of disk cartridges in a limited space. Moreover, it is possible to provide an extremely small type of an optical disk drive to thereby design a memory unit applicable to various services including a portable apparatus. This is a media convertible storage system, which is superior in dust immunity and rapid access of a fixed magnetic disk and can record large-scale information and can satisfy various requests from miscellaneous application fields.

4 Claims, 17 Drawing Sheets

OPTICAL LIBRARY AND OPTICAL STORAGE SYSTEM

This is a divisional application of U.S. patent application Ser. No. 09/528,815 filed Mar. 20, 2000, now U.S. Pat. No. 6,614,751; which claims priority to Japanese Patent Application No. 11-113997 filed Mar. 18, 1999; Japanese Patent Application No. 11-209627 filed Jun. 21, 1999; and Japanese Patent Application No. 11-209628 filed Jun. 21, 1999; and which is incorporated herein in its entirety.

BACKGROUND OF THE INVENTION

1. Field of the Invention

The present invention relates to an optical disk drive, a disk cartridge and an optical storage system provided with them. Moreover, the present invention relates to a media convertible storage system used to record, reproduce and keep a high density information, and more particularly relates to an optical storage system including an optical library.

2. Description of the Related Art

Conventionally, as a large capacity memory unit employed in a video camera, a computer and the like, a media convertible memory unit is mainly used, such as a magnetic tape, a fixed magnetic disk, an optical disk or the like. In the magnetic tape memory unit, the magnetic tape accommodated in a tape cartridge is inserted in a tape drive, and a data is sequentially recorded in conjunction with winding of a tape. Making the tape longer increases a record area to thereby increase its storage capacity. The fixed magnetic disk tries to cancel out the influence of dust and the like, by designing the closed structure that a magnetic disk is built in the disk drive. Further, the fixed magnetic disk tries to increase its storage capacity by making a magnetic head extremely close to the surface of the disk. The disk is fixed to a spindle motor to thereby reduce a chucking error and a run-out of the disk, and accordingly insure a rapid access and a stable operation. Also, in the media convertible storage system, a disk cartridge using a magneto-optic effect and a phase change is standardized by ISO and the like. In this disk cartridge, since a record area of the media is limited, it is inferior in storage capacity to the magnetic tape. However, access can be arbitrarily done to recorded information. Thus, it is possible to quickly correspond to a reproduction of desirable information.

The disk cartridge has the following structure. That is, when it is inserted into the optical disk drive, a shutter is opened to accordingly expose the optical disk, which enables the access to the optical head or the chucking of the spindle motor. The disk cartridge is slower in access speed than the fixed magnetic disk because of a chucking error to the spindle motor when the disk cartridge is accommodated in the optical disk drive and a weight of the optical head. On the contrary, the disk cartridge is superior in storage density. Moreover, it is used to keep the large-scale information by taking advantage of the media convertible type.

In recent years, a processing amount of information has been increased due to the large improvement of performance of CPU, peripheral parts and the like in a computer and the great progress and complexity of a software. Moreover, a TV broadcast and a video camera are largely digitized so that image information is captured and treated in the computer. Under such situation, the access to the recorded information cannot be done arbitrarily, in the memory using the magnetic tape. Thus, it is not suitable for a process, such as information edition or the like. Also, it is difficult in management to store all information in one fixed magnetic disk. Hence, it is impossible to cope with the increase of the accumulating information amount. Moreover, if crush of a floating magnetic head and the like occur, the whole memory cannot be used, which results in the loss of all the recorded information.

The media convertible storage system employing the disk cartridge is superior in random access to recorded information. Also, it is superior in correspondence to management of high-density information and an increasing information amount. However, the structure, in which the surface of the optical disk is exposed, causes dust, oil mist, vapor, bacteria and other minute particles in ambient air to be sucked into interior of the apparatus and further invade in the gap between the optical head and the surface of the optical disk and finally damage the recording and reproducing functions. Even in the optical disk, it is necessary to make the optical head extremely close to the surface of the optical disk in order to increase the storage capacity. Hence, any minute foreign material should be avoided from invading.

If the combination usage of the fixed magnetic disk system and the media convertible storage system tries to solve the above-mentioned problems, this results in new problems of increase of an apparatus installation space and a high cost.

Moreover, in the conventional optical library, a space in which a mechanism for mounting and detaching the optical disks or the disk cartridges in or from the optical disk library is complex, and a wide space is necessary, which causes the optical library to be made larger, and the cost to be expensive, and the reliability to be deteriorated.

Furthermore, the conventional disk cartridge requires a mechanism for opening and closing a shutter of the disk cartridge and then chucking the optical disk on the spindle motor, which results in the problems of the larger scales of optical disk drive, the higher cost, the deteriorations of reliability and the like.

SUMMARY OF THE INVENTION

The present invention is proposed in view of the above-mentioned circumstances. It is therefore an object of the present invention to attain a disk cartridge superior in dust immunity.

Another object of the present invention is to provide a disk cartridge having a simplified structure and a low cost.

Still another object of the present invention is to provide a disk cartridge having an excellent reliability and a structure suitable for a large storage capacity, which will be required by the technical innovation in future.

Still another object of the present invention is to provide a disk cartridge in which a chucking mechanism of an optical disk is removed when it is mounted in an optical disk drive.

Still another object of the present invention is to provide an optical disk drive of a rapid access, a large storage capacity, a low cost and a high reliability.

Still another object of the present invention is to provide an optical disk drive in which a chucking mechanism of a disk cartridge can be removed.

Still another object of the present invention is to provide an optical library in which a chucking mechanism of a disk cartridge can be removed.

Still another object of the present invention is to provide a disk cartridge superior in dust immunity to thereby improve the dust immunity of an optical storage system.

Still another object of the present invention is to provide an optical storage system in which a plurality of disk cartridges can be easily accommodated in an optical disk drive, and even a single optical disk drive can cope with various services with regard to the operations of recording and reproducing information, such as an operation of storing a frequently used program, an operation of keeping a large-scale information, a backup of a recorded program and information, and the like.

Still another object of the present invention is to provide an optical storage system suited to record, reproduce or keep a large-scale image information in which a chucking mechanism of a disk cartridge can be removed in an optical library and a large number of disk cartridges can be accommodated in a small type optical library.

Still another object of the present invention is to provide a compact optical storage system suitable for a small note type computer, an image information storage apparatus and the like, in which it can be used only by inserting a part of a disk cartridge into an optical disk drive, and great importance is placed on portability.

In order to attain the above-mentioned objects, the first feature of the present invention lies in a disk cartridge having a frame, an optical disk mounted in this frame, a spindle motor for holding this optical disk rotatable, an optical head assembly disposed on the frame, a cartridge-side-connector and an optical window mounted on the frame. Here, the frame has a hermetically sealed structure. And, the optical head assembly has an optical head, which can access a surface of the optical disk, and a seeking mechanism for positioning this optical head at a specified track on the optical disk. The cartridge-side-connector is so designed that it electrically connects the spindle motor and a drive unit of the optical head assembly to an outer portion of the disk cartridge. The optical window is made of material transparent to a wavelength of a light beam.

The disk cartridge of the present invention can attain such a simplified structure, and can be provided with a low cost. Especially, the spindle motor is mounted in the disk cartridge to thereby enable the removal of a chucking mechanism of the optical disk when it is mounted in an optical disk drive, and also enable a plurality of disk cartridges to be easily accommodated in the optical disk drive. Moreover, the disk cartridge is designed as the hermetically sealed structure. Thus, it is possible to protect the optical disk and an objective lens from dust in ambient air, and possible to insure the excellent reliability and also possible to provide the structure suitable for a large storage capacity which will be required by the technical innovation in future.

The second feature of the present invention lies in an optical disk drive having an optical assembly, a disk cartridge guide member for guiding a disk cartridge to a predetermined position within the optical disk drive, a disk cartridge lock mechanism and a drive-side-connector. Here, the optical assembly has optical elements necessary for a generation and a detection of a light beam used to record and reproduce information. The optical assembly further has a mechanism for adjusting a position of the light beam. The disk cartridge lock mechanism holds the disk cartridge at a predetermined position within the optical disk drive when the disk cartridge is used. And the disk cartridge lock mechanism ejects the disk cartridge outside the optical disk drive, when it is not used. The drive-side-connector is so configured that it will be fitted into and electrically connected to a cartridge-side-connector on the disk cartridge.

In the optical disk drive of the present invention, the optical system for recording and reproducing information is divided so that the optical assembly requiring high cost is mounted on the side of the optical disk drive. Accordingly, the structure of the disk cartridge described in the first feature can be simplified to thereby attain low cost cartridges.

The third feature of the present invention lies in an optical library comprising an accommodation rack for accommodating a plurality of disk cartridges, an optical assembly, a moving mechanism, a disk cartridge lock mechanism, and a library-side-connector. The optical assembly has optical elements necessary for a generation and a detection of a light beam used to record and reproduce information. And the optical assembly has a mechanism for adjusting a position of the light beam. The moving mechanism moves and holds the optical assembly to and at a position corresponding to any of disk cartridges. The disk cartridge lock mechanism holds the disk cartridge at a predetermined position within the optical library, when the disk cartridge is used. And, the disk cartridge lock mechanism ejects the disk cartridge outside the optical library, when it is not used. The library-side-connector is so configured that it will be fitted into and electrically connected to a cartridge-side-connector on the disk cartridge.

According to the optical library of the present invention, a large number of disk cartridges described in the first feature can be accommodated in the compact and small optical library. Thus, it is possible to provide an optical storage system suitable for the service to record, reproduce or keep large-scale image information.

The fourth feature of the present invention lies in an optical storage system comprising the disk cartridge described in the first feature and the optical disk drive described in the second feature.

In the optical storage system according to the fourth feature of the present invention, the optical disk, the optical head and the seeking mechanism are mounted in the disk cartridge, and the optical assembly requiring high cost is mounted in the optical disk drive. Namely, as stated in the second feature, the optical system for recording and reproducing information is divided into the disk cartridge and the optical disk drive, considering the costs and volumes of constituent elements. Thus, the structure of the disk cartridge can be simplified so as to attain low cost cartridges. Moreover, the spindle motor is mounted in the disk cartridge to accordingly enable the removal of the chucking mechanism of the optical disk when it is mounted in the optical disk drive, and also enable a plurality of disk cartridges to be easily accommodated in the optical disk drive. Hence, even a single optical disk drive can cope with various services of recording and reproducing information. The services may include storing frequently used programs, keeping large-scale information, and backuping of recorded programs and information, etc. Also as described in the first feature, the disk cartridge has the hermetically sealed structure. Thus, it is possible to protect the optical disk and the optical head from dust in ambient air, and possible to insure the excellent reliability. And the optical storage system of the fourth feature can provide the structure suitable for the large storage capacity system, which will be required by the technical innovation in future.

The fifth feature of the present invention lies in an optical storage system comprising a plurality of disk cartridges containing the first and second disk cartridges having the structure described in the first feature and the optical disk drive described in the second feature. For example, the first disk cartridge has a first frame, a first optical disk mounted in this first frame, a first spindle motor for holding this first optical disk rotatable, a first optical head assembly, a first cartridge-side-connector and a first optical window mounted on the first frame. On the other hand, the second disk cartridge has a second frame, a second optical disk mounted in this second frame, a second spindle motor for holding this second optical disk rotatable, a second optical bead assembly, a second cartridge-side-connector and a second optical window which is mounted on the second frame. Here, the first and second frames have hermetically sealed structures, respectively. The first and second optical head assemblies have optical heads which can access surface of the first and second optical disks and seeking mechanisms for positioning the respective optical heads at specified tracks on the first and second optical disks, respectively. And, as described in the second feature, the optical disk drive has an optical assembly, first and second disk cartridge guide members for guiding the first and second disk cartridges to predetermined positions within the optical disk drive, first and second disk cartridge lock mechanisms, first and second drive-side-connectors and an optical path switching mechanism for selectively leading the light beam to the first or second disk cartridge. The optical assembly has optical elements necessary for a generation and a detection of a light beam used to record and reproduce information and a mechanism for adjusting positions of the light beam. The first and second disk cartridge lock mechanisms hold the first and second disk cartridges at predetermined positions within the optical disk drive, when the first and second disk cartridges are used. And the first and second disk cartridge lock mechanisms eject the first and second disk cartridges outside the optical disk drive when they are not used, respectively. The first and second cartridge side connectors are configured such that they electrically connect to first and second drive-side-connectors, respectively.

In the optical storage system according to the fifth feature of the present invention, the optical disk, the optical head and the seeking mechanism are mounted in the first and second disk cartridges, respectively, and the optical assembly requiring high cost is mounted in the optical disk drive, and then the optical system is divided. Thus, the structures of the first and second disk cartridges can be simplified so that low cost cartridges can be commercially provided. Moreover, the spindle motors are mounted in the first and second disk cartridges to accordingly enable the removal of the chucking mechanism of the optical disk when it is mounted in the optical disk drive, and also enable a plurality of disk cartridges to be easily accommodated in the optical disk drive. Hence, even a single optical disk drive can cope with various services with regard to the operations of recording and reproducing information. The various services may include storing frequently used programs, keeping large-scale information. The backup of recorded programs and information is also possible by the optical storage system of the fifth feature. Also as described in the first feature, the first and second disk cartridges have the hermetically sealed structure. Thus, it is possible to protect the optical disk and the optical head from dust in ambient air, and possible to insure the excellent reliability of the optical storage system. Further, the optical storage system of the fifth feature can provide the structure suitable for the large storage capacity system, which will be required by the technical innovation in future.

The sixth feature of the present invention lies in an optical storage system comprising a plurality of disk cartridges described in the first feature and the optical library described in the third feature.

In the optical storage system according to the sixth feature of the present invention, the optical system for recording and reproducing information is divided into the plurality of disk cartridges and the optical library, regarding the cost and volume of the constituent elements. That is, the optical disk, the optical head and the seeking mechanism are mounted in each of the plurality of the disk cartridges. On the other hand, the optical assembly, which has optical elements necessary for a generation and a detection of a light beam, as well the mechanism for adjusting the position of the light beam, is mounted in the optical library. Further, each of the disk cartridges has the hermetically sealed structure. Thus, it is possible to protect the optical disk and the optical head, which are enclosed in each of the disk cartridges, from dust in ambient air. Then it is possible to insure the excellent reliability of the optical storage system. Furthermore, the optical storage system of the sixth feature can provide the structure suitable for the large storage capacity system, which will be required by the technical innovation in future. In the optical storage system of the sixth feature, the spindle motor is further mounted in the disk cartridge to accordingly enable the removal of the chucking mechanism of the disk cartridge within the optical library. Hence, it is possible to accommodate a large number of disk cartridges in a geometrically small optical library. Therefore, it is possible to provide the optical storage system suitable for the services with regard to the operation of recording, reproducing and keeping large-scale information.

Other and further objects and features of the present invention will become obvious upon an understanding of the illustrative embodiments about to be described in connection with the accompanying drawings or will be indicated in the appended claims, and various advantages not referred to herein will occur to one skilled in the art upon employing of the invention in practice.

DETAILED DESCRIPTION OF THE PREFERRED INVENTION

Figure 1:
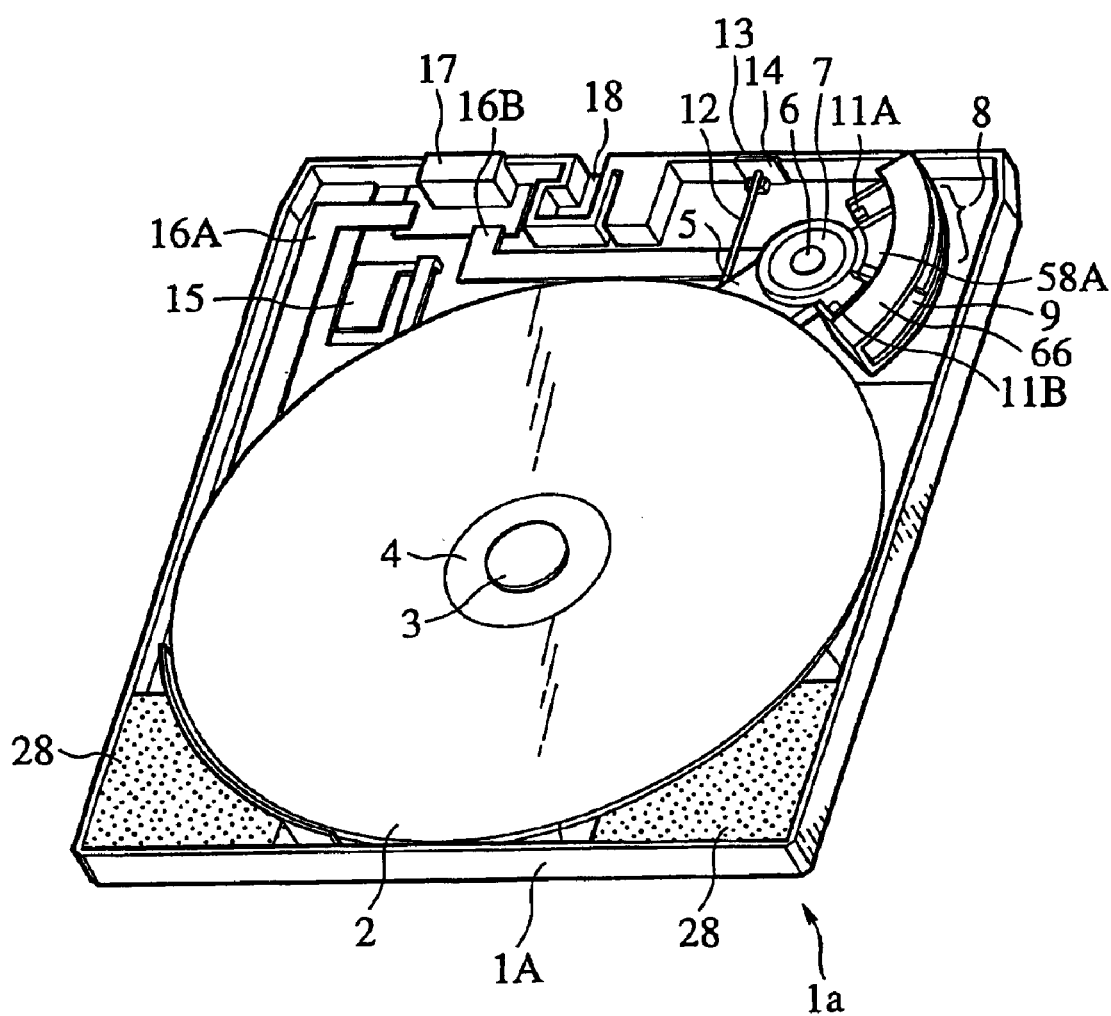
FIG. 1 is a perspective view showing a disk cartridge according to a first embodiment of the present invention.

Various embodiments of the present invention will be described with reference to the accompanying drawings. It is to be noted that the same or similar reference numerals are applied to the same or similar parts and elements throughout the drawings, and the description of the same or similar parts and elements will be omitted or simplified. In the following descriptions, numerous specific details are set fourth to provide a through understanding of the present invention. However, it will be obvious to those skilled in the art that the present invention may be practiced without specific details.
(First Embodiment)

As described later, an optical storage system according to a first embodiment of the present invention is provided with an optical disk drive and a plurality of disk cartridges accommodated therein. The disk cartridge is firstly described.

Figure 3:
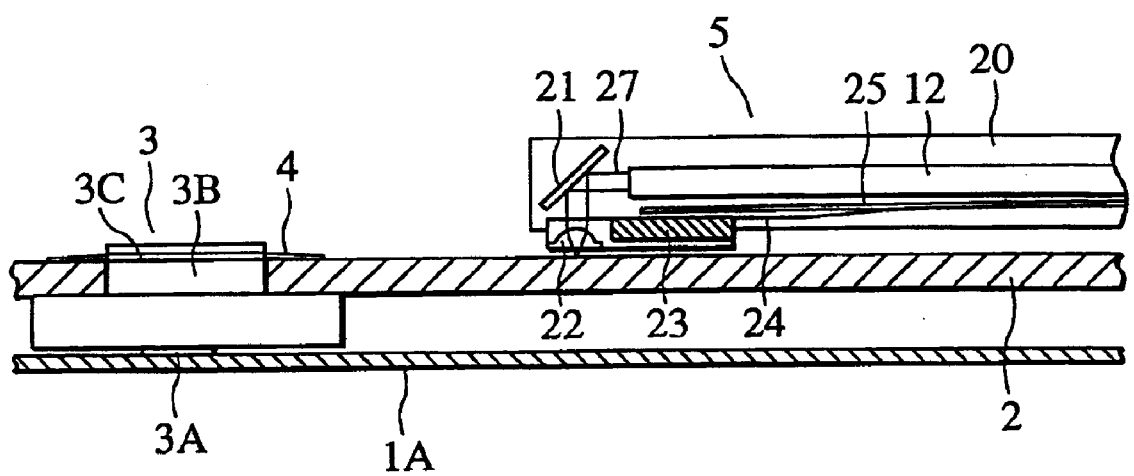
FIG. 3 is a stepped cross sectional view of the optical disk and the optical head assembly taken along broken line II—II of FIG. 2.
Figure 4:
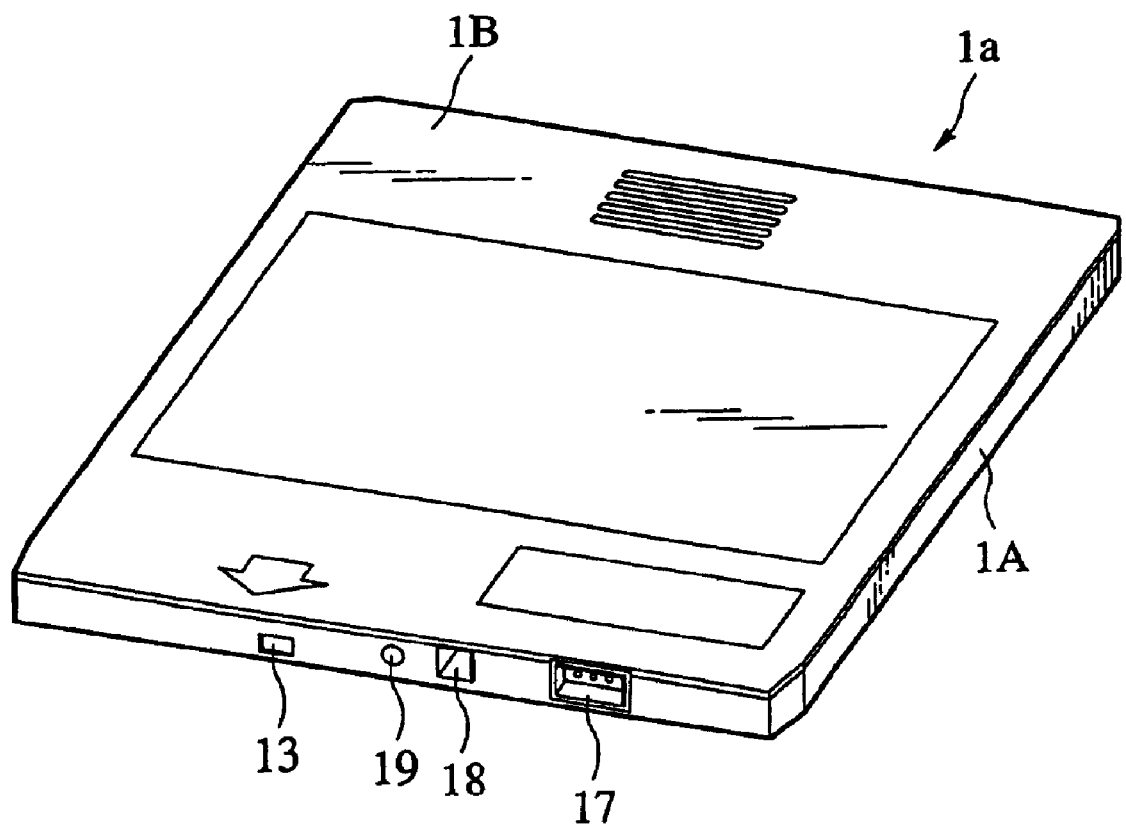
FIG. 4 is a perspective view showing an appearance of the disk cartridge according to the first embodiment of the present invention.

FIG. 4 is a perspective view showing the appearance of the disk cartridge used in the optical storage system according to the first embodiment of the present invention. FIG. 1 is a perspective view showing a state that a top cover 1B of a frame shown in FIG. 4 is detached. A disk cartridge 1a according to the first embodiment of the present invention is composed of frames (1A, 1B) having hermetically sealed structure, an optical disk 2 accommodated in the frames (1A, 1B), a spindle motor 3 for holding this optical disk 2 rotatable, an optical head assembly 5, a cartridge-side-connector 17, and an optical window 13 which is mounted on the frames (1A, 1B) and made of material transparent to a wave length of a light beam. Here, the optical head assembly 5 is composed of optical heads (21, 22, 23 and 24), which can access a surface of the optical disk 2 and a seeking mechanism 8 for positioning the optical heads (21, 22, 23 and 24) to specified positions on the optical disk 2. As shown in FIG. 3, the optical head is composed of an objective lens 22 (or an optical stylus in a form of needle made of glass fiber and the like) mounted on a slider 23, a reflection mirror 21 mounted in the vicinity of this slider 23, an elastic member 24 for giving a certain pushing force against the surface of the optical disk to this slider 23, and an arm 20 for supporting this elastic member 24 and this reflection plate. The slider 23 slides while maintaining a minute gap equal to or less than several μm from the surface of the optical disk, associated with the rotation of the optical disk 2, or is always in contact with the surface of the optical disk. The cartridge-side-connector 17, electrically connects the spindle motor 3 and a drive unit of the optical head assembly 5 to the outer portion of the disk cartridge 1a. In FIG. 1, the inner portion of the disk cartridge 1a is completely closed by closing the top cover 1B shown in FIG. 4.

Figure 2:
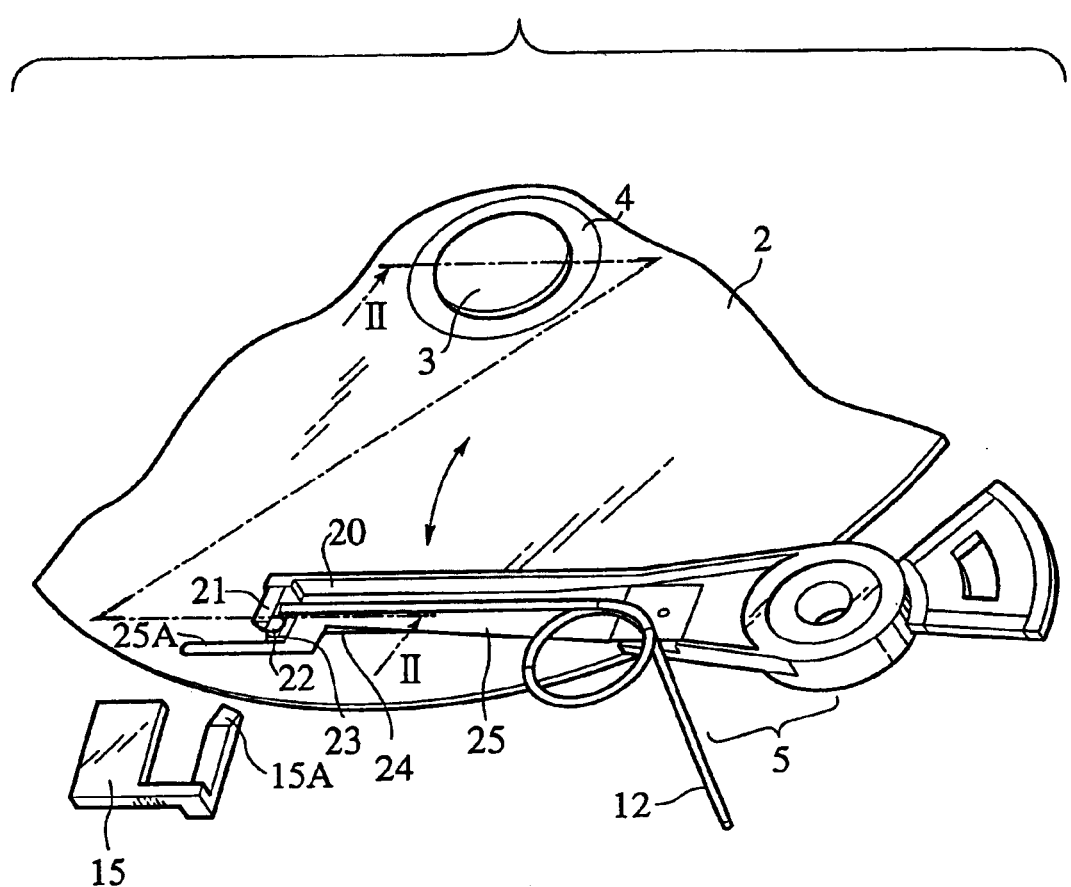
FIG. 2 is a detailed perspective view showing configurations of an optical disk and an optical head assembly in the disk cartridge of FIG. 1.

The optical disk 2 may be information storage media formed on substrate made of aluminum (Al), glass, plastic, ceramic and the like. The optical disk 2 is fixed to a rotor of the flat spindle motor 3 mounted on a bottom cover 1A of the frame by a pushing plate 4 so that a deviation error between a rotational center and a track on the optical disk 2 is kept to a minimum. As shown in FIGS. 1 and 2, the optical head assembly 5 is rotatably supported around a rotational shaft 6 fixed on the bottom cover 1A of the frame through a bearing member 7, and driven by the seeking mechanism 8 of a voice coil motor composed of an electromagnetic coil 58A, a permanent magnet 9 and a core 66. The seeking mechanism 8 is integrated with the optical heads (21, 22, 23 and 24), and supported on the same frame as the frame 1A for supporting the spindle motor 3, in such way that the seeking mechanism 8 can be rotated or straightly moved. So, the seeking mechanism 8 drives the optical heads (21, 22, 23 and 24) straightly or circularly. A voice coil, in which the permanent coil and the electromagnetic coil 58A are combined, or an ultrasonic actuator in which a piezoelectric element and a pressure plate are combined, or the like constitutes the driving mechanism. This driving mechanism of the seeking mechanism 8 has a positioning accuracy and a frequency response characteristic, which are enough to trace a track of the rotating optical disk 2. As necessary, the seeking mechanism 8 may have a plurality of driving mechanisms in which the positional accuracies are different from each other so that a track tracing performance is made higher. Cushion members 11A, 11B made of elastic material are mounted in the seeking mechanism 8 so that the optical head assembly 5 is stopped at an end of its rotational range in a minimum shock.

A light guide member 12 guides a light beam 27 incident from the optical window 13 on the bottom cover 1A of the frame into the optical heads (21, 22, 23 and 24). The light guide member 12 is constituted by the combination of a glass fiber having a high transparency, a plastic fiber and an optical element for reflecting or refracting a light and the like. The optical window 13 is made of glass having excellent optical transparency, or plastic material such as polymethylmethacrylate (PMMA), polycarbonate and the like. Then, the optical window 13 is configured at a position at which the light beam 27 emitted from an optical assembly in the optical disk drive is received when the disk cartridge 1a is accommodated in the optical disk drive. A reflection plate 14 is mounted around the optical path through which the light beam should be transmitted, in the optical window 13 constituted by transparent member. The reflection plate 14 reflects the light beam 27 deviated to the periphery of the light guide member 12, to the outer portion of the disk cartridge 1a. In order to adjust the deviation of the light beam caused by characteristics difference between the disk cartridges, it is possible to reflect the light beam deviated from the optical path, and then return back to the optical assembly, and accordingly detect the deviation amount by using a photo diode in this assembly. The reflection plate 14 may be configured by sticking a metallic plate made of aluminum having an excellent optical reflectance, a metallic film such as aluminum and the like, or directly sticking or depositing a metallic film, such as aluminum and the like, on the transparent member constituting the optical window.

An off-loader 15 shown in FIGS. 1 and 2 removes a tip 25A of the optical head assembly 5 (or an extension 25A of a suspension 25, which will be explained later) from the surface of the optical disk 2. Printed circuit boards 16A, 16B electrically connect the voice coils, such as the electromagnetic coil 58A and the like, for respectively constituting the spindle motor 3 and the seeking mechanism 8, to the cartridge-side-connector 17. The cartridge-side-connector 17, is mounted on a side of a front in an approach direction when the disk cartridge 1a is inserted into the optical disk drive, and automatically connected to a drive-side-connector within the optical disk drive after the completion of the insertion operation. A capsular notch 18, which is formed on the frame 1A, functions as a part of a disk cartridge lock mechanism.

A filter 28 is mounted in order to catch the micro dust remaining on respective parts when they are fabricated, and then maintain the clean degree within the disk cartridge 1a for a long period. The filter 28 also catches the oil mist generated from the bearings of the spindle motor 3 and the seeking mechanism 8. The filter 28 further catches the vapor, the bacteria or other particles so as to keep the clean degree within the disk cartridge 1a. The filter 28 is an element in a form of cloth or net which is made of natural fiber, synthetic fiber and the like and contains active carbon, ceramic, adhesive material, or made of dielectric material electrified with positive or negative charges.

FIG. 2 is a perspective view showing the optical disk 2 and the optical head assembly 5 according to the first embodiment. The reflection mirror 21 is mounted at an end of the arm 20 on the optical head assembly 5. The reflection mirror 21 reflects the light beam 27 passed through the light guide member 12, and guides it to the objective lens 22. The slider 23 is supported by a suspension 25 through the elastic member 24. The suspension 25 is fixed on the arm 20. A metallic plate having spring performance, a metallic wire, a plastic plate, a plastic wire and the like constitutes the elastic member 24. The optical head assembly 5 is driven so as to demonstrate a circular arc. When the optical disk 2 is stopped, the slider 23 is moved outside the surface of the optical disk 2, and the extension 25A of the suspension 25 is stood on an inclination portion 15A of the off-loader 15. Thus, the slider 23 is shunted such that it is withdrawn from the surface of the optical disk, in a direction vertical to the surface of the optical disk. FIG. 3 is a cross sectional view to further explain the optical head assembly 5. A central shaft 3A of the spindle motor 3 is fixed to the bottom cover 1A of the frame, and the optical disk 2 is compressed by the pushing plate 4 and fixed on a rotor 3B. The pushing plate 4 is made of plate material having the spring performance, and donut-shaped. Then, since an inner circumference portion is fitted into a slot 3C formed on the rotor 3B, pressure is applied to the optical disk 2 on the surface in the vicinity of an outer circumference. Accordingly, an assembling of the disk cartridge 1a is simplified so as to make the automated manufacturing of the disk cartridge 1a easy, and further to reduce a fabrication cost of the disk cartridge 1a. The objective lens 22 is located between the reflection mirror 21 and the optical disk 2, and mounted on the slider 23 sliding on the surface when the optical disk 2 is rotated. The light beam 27 transmitted through the light guide member 12 is reflected on the reflection mirror 21, and passed through the objective lens 22, and then converged onto information storage medium formed on the surface of the optical disk 2. Moreover, the light reflected on the storage medium is returned through the same route to the light guide member 12. The slider 23 receives the mechanically free degree by which a predetermined floating gap can be maintained even against a dynamic deflection on the surface of the optical disk, such as a run-out in a rotational axis direction and the like, from the elastic member 24. The slider 23 is supported in a constant pushing force against the surface of the optical disk, through the suspension 25.

FIG. 4 is a perspective view showing the appearance of the disk cartridge 1a according to the first embodiment. That is, the frames (1A, 1B) of the disk cartridge 1a according to the first embodiment are constituted by the bottom cover 1A and the top cover 1B fabricated by injection of plastic material or metallic material such as aluminum and the like. And the frames (1A, 1B) of the disk cartridge 1a have the hermetically sealed structure, which are fastened by screws and the like or fixed by ultrasonic welding or adhesive. In this way, they are adhered and fixed without gap, and the inner portion of the disk cartridge 1a is hermetically sealed. Moreover, in order to further improve the hermetically sealed degree, a packing made of elastic material, such as rubber and the like, may be mounted on a junction surface between the bottom cover 1A and the top cover 1B. For this reason, the optical window 13 is mounted in the bottom cover 1A of the frame, and an opening is covered by a transparent member, such as plastic or glass in a form of plate so that only the light can be transmitted.

The cartridge-side-connector 17, is mounted on a front side with respect to the insertion direction of the disk cartridge 1a into an optical disk drive 30. Then, after the insertion of the disk cartridge 1a, the cartridge-side-connector 17, is automatically engaged with and electrically joined to the driver-side-connector (not shown) mounted in the optical disk drive 30. The capsular notch 18 and a positioning hole 19 which are similarly mounted on the front surface are respectively fitted into members mounted in the optical disk drive 30, and constitute the disk cartridge lock mechanism for holding the disk cartridge 1a at a predetermined position in the optical disk drive 30.

Figure 5:
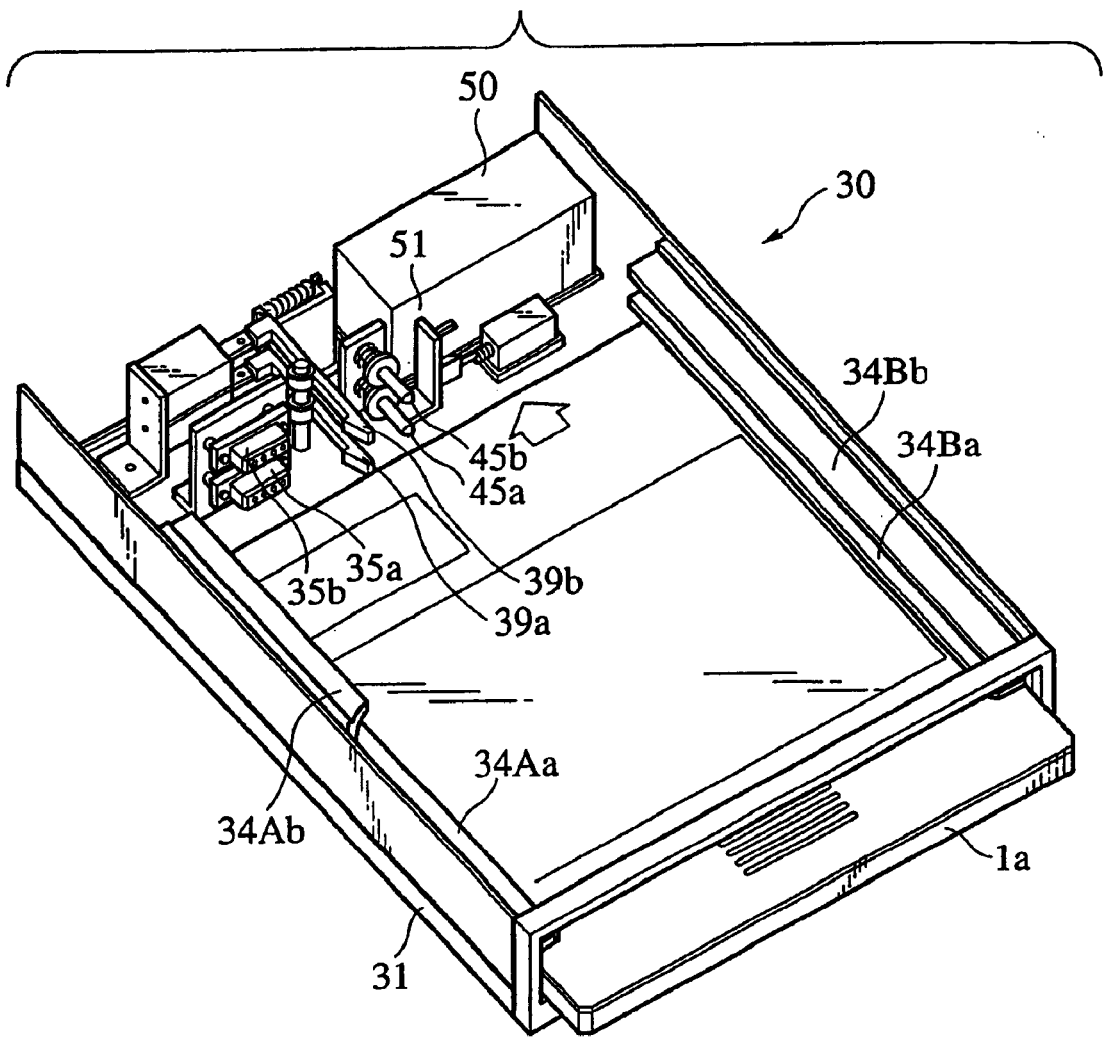
FIG. 5 is a perspective view showing a configuration of an optical disk drive according to the first embodiment of the present invention.
Figure 5:
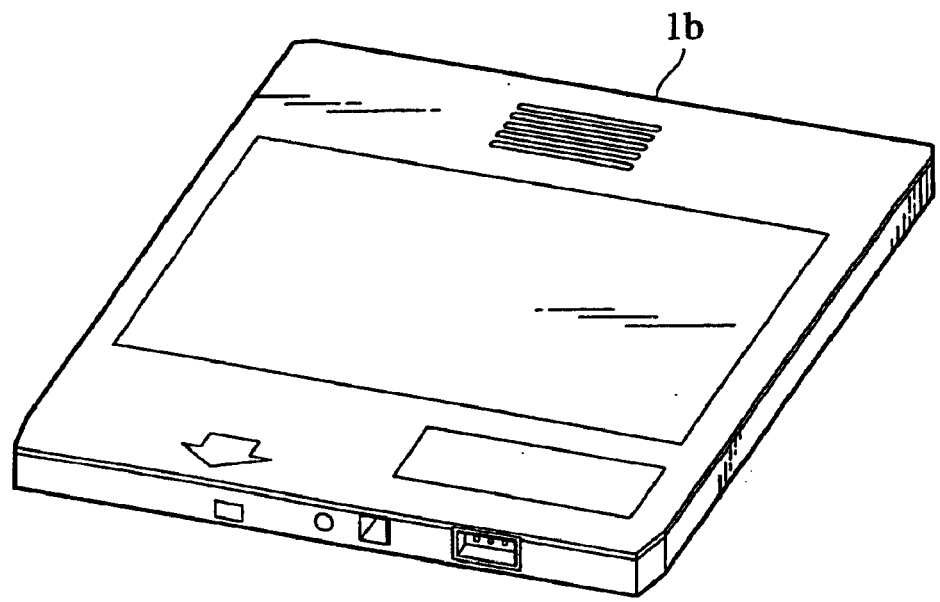

FIG. 5 is a perspective view showing the configuration of the optical disk drive 30 into which the disk cartridge according to the first embodiment is inserted, and shows a state that a top cover (not shown) of the optical disk drive 30 is detached. The disk cartridge 1a according to the first embodiment, when inserted into the optical disk drive 30, is guided in a form of slider to the disk cartridge guide members 34Aa, 34Ba mounted on both inner sides of a base plate 31, and then led to a predetermined position within the optical disk drive 30. The optical disk drive 30 can accommodate therein a plurality of disk cartridges 1a, 1b, . . . . The disk cartridge guide members 34Aa, 34Ba, 34Ab, 34Bb, . . . have guide rails corresponding to the number of disk cartridges 1a. Then, drive-side-connectors 35a, 35b, . . . , lock arms 39a, 39b, . . . and positioning pins 45a, 45b, . . . are mounted within the optical disk drive 30. The numbers of drive-side-connectors, lock arms and positioning pins are equal to those of disk cartridges 1a, 1b, . . . in which they can be respectively accommodated.

In the following explanation, an optical disk drive 30 is exemplified which can accommodate therein two disk cartridges 1a, 1b. However, it is evident that the optical disk drive 30 according to the first embodiment can be applied to the structure in which three or more disk cartridges 1a, 1b, . . . can be accommodated. That is, the optical disk drive 30 according to the first embodiment is provided with: an optical assembly 50 for accommodating optical elements necessary for generation and detection of a light beam used to record and reproduce information, and a mechanism to adjust a position of the light beam; first disk cartridge guide members 34Aa, 34Ba for guiding a first disk cartridge 1a to a predetermined position within the optical disk drive 30;

second disk cartridge guide members 34Ab, 34Bb for guiding a second disk cartridge 1b to a predetermined position within the optical disk drive 30; first disk cartridge lock mechanisms (39a, 45a) which when the first disk cartridge 1a is used, holds it at a predetermined position within the optical disk drive 30, and when not used, ejects it outside the optical disk drive 30; second disk cartridge lock mechanisms (39b, 45b) which when the second disk cartridge 1b is used, holds it at a predetermined position within the optical disk drive 30, and when it is not used, ejects it outside the optical disk drive 30; a first drive-side-connector 35a which is fitted into and electrically connected to a cartridge-side-connector on the first disk cartridge 1a; a second drive-side-connector 35b which is fitted into and electrically connected to the cartridge-side-connector on the second disk cartridge 1b; and an optical path switching mechanism 51 for selectively guiding the light beam to the first disk cartridge 1a or the second disk cartridge 1b. Here, the optical assembly 50 is composed of, for example, a semiconductor laser diode for generating a light beam, a beam splitter for splitting the light beam, a collimator lens for modifying the shape of the light beam; a photo diode for detecting the deviation of a position of a light beam returning from the surface of the optical disk; a fine actuator for driving a corresponding optical element in order to finely adjust a position of a light beam emitted from the optical assembly 50; and the like.

Figure 6:
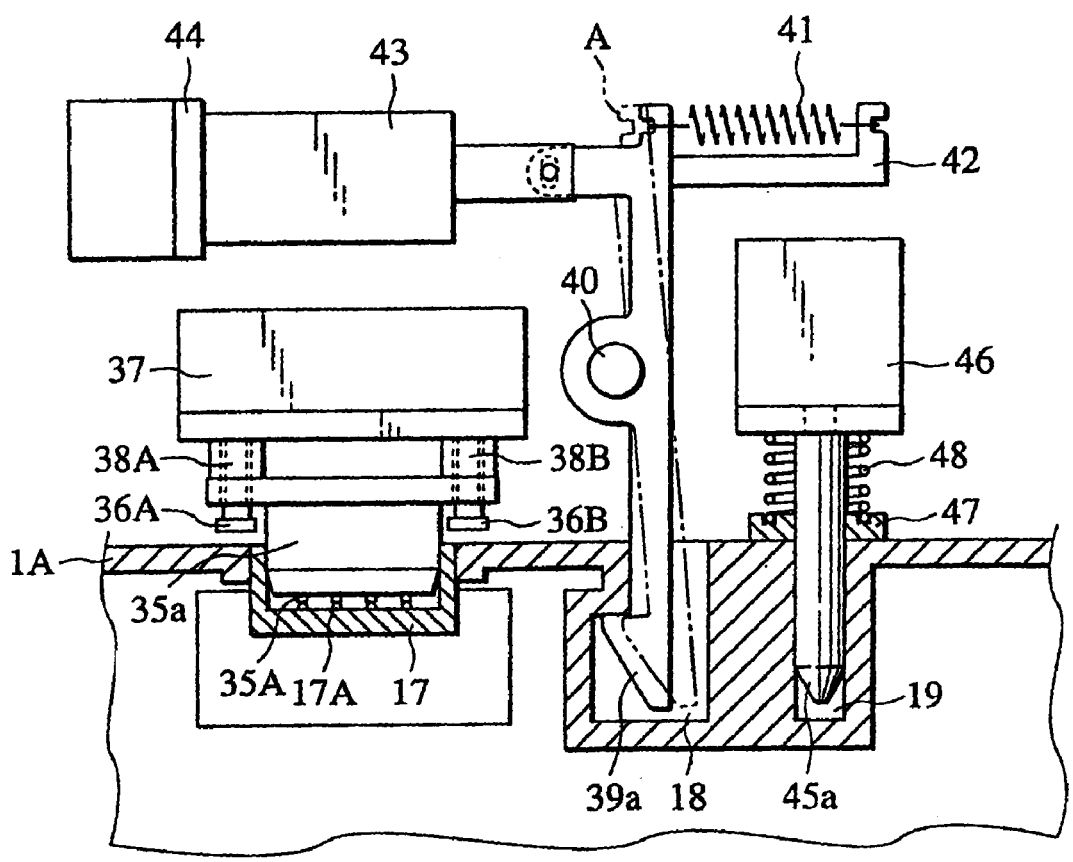
FIG. 6 is a partially cross sectional view showing a disk cartridge lock mechanism and a connector, according to the first embodiment of the present invention.

FIG. 6 is a partially cross sectional view to explain the actions of the disk cartridge lock mechanisms and the connectors of the optical disk drive 30 according to the first embodiment. FIG. 6 explains in detail the case when the insertion of the first disk cartridge 1a into the optical disk drive 30 is completed. However, of course, it similarly explains the case even when the insertion of the second disk cartridge 1b into the optical disk drive 30 is completed. That is, when the insertion of the first disk cartridge 1a into the optical disk drive 30 is completed, the first drive-side-connector 35a within the optical disk drive 30 is fitted into the cartridge-side-connector 17, mounted on the bottom cover 1A of the frame. Accordingly, respective contacts 17A, 35A are in contact with each other to thereby establish the electrical connection. The first drive-side-connector 35a is slidably supported through sliding shafts 36A, 36B, and the sliding shafts 36A, 36B are attached to a support plate 37 mounted on a base plate of the optical disk drive 30. In order to smooth the engaging operation between the connectors, proper play is provided in the sliding portions of the first drive-side-connector 35a and the sliding shafts 36A, 36B. Moreover, in order to absorb the shock caused by the insertion of the first disk cartridge 1a, dampers 38A, 38B made of elastic material are mounted between the drive-side-connector 35a and the support plate 37.

An arm shaft 40 rotatably supports a first lock arm 39a. A tip is hook-shaped which is inserted into the capsular notch 18 of the first lock arm 39a. The other end of the first lock arm 39a is urged to one direction by a spring 41, and stopped at a predetermined position by a stopper 42. Moreover, it is sucked by an electromagnetic solenoid 43 to a direction opposite to the urge direction of the spring 41. The electromagnetic solenoid 43 is fixed to a support plate 44 mounted on a base plate 31 of the optical disk drive 30. When the first disk cartridge 1a is inserted, the first lock arm 39a is guided to an inclination portion of the hook-shaped portion of its tip, and rotated oppositely to the urge direction of the spring 41. When the insertion operation is ended, the hook-shaped portion is fitted into the capsular notch 18, and it returns back to the original position. A first positioning pin 45a is fixed to a support plate 46 mounted on the base plate 31 of the optical disk drive 30. When the first disk cartridge 1a is inserted, the first positioning pin 45a is engaged with the positioning hole 19 formed on the bottom cover 1A of the frame to accordingly align the first disk cartridge 1a with a predetermined position. An ejector 47 is slidably supported around the first positioning pin 45a, and urged by a spring 48 mounted between the support plate 46 and the ejector 47. When the first disk cartridge 1a is ejected outside the optical disk drive 30, the electromagnetic solenoid 43 is energized to thereby suck the end of the first lock arm 39a. The first lock arm 39a is rotated up to a position of "A" shown in FIG. 6 to accordingly release the hook-shaped portion at the other end from the capsular notch 18. The first disk cartridge 1a released from the lock state is pushed outside the optical disk drive 30 through the ejector 47 by the urge force of the spring 48.

Although inserted configuration are not shown for the second disk cartridge 1b, substantially similar explanation can be hold for the case when second disk cartridge 1b is inserted into the optical disk drive 30. That is, the arm shaft 40 rotatably supports a second lock arm 39b (See FIG. 5). A tip is hook-shaped which is inserted into the capsular notch 18. When the second disk cartridge 1b is inserted, the second lock arm 39b is guided to an inclination portion of the hook-shaped portion of its tip, and rotated oppositely to the urge direction of the spring. When the insertion operation is ended, the hook-shaped portion is fitted into the capsular notch 18, and it returns back to the original position. A second positioning pin 45b is fixed to the same support plate 46 mounted on the base plate 31 of the optical disk drive 30. When the second disk cartridge 1b is inserted, the second positioning pin 45b is engaged with the positioning hole 19 formed on the bottom cover 1A of the frame to accordingly position the second disk cartridge 1b at a predetermined position. Although not shown, an ejector having the same structure shown in FIG. 6 is also slidably supported around the second positioning pin 45b, and urged by a spring mounted between the support plate 46 and the ejector. When the second disk cartridge 1b is ejected outside the optical disk drive 30, the electromagnetic solenoid is energized to thereby suck the end of the second lock arm 39b so that the hook-shaped portion of the other end is released from the capsular notch 18. The second disk cartridge 1b released from the lock state is pushed outside the optical disk drive 30 through the ejector by the urge force of the spring.

Figure 7:
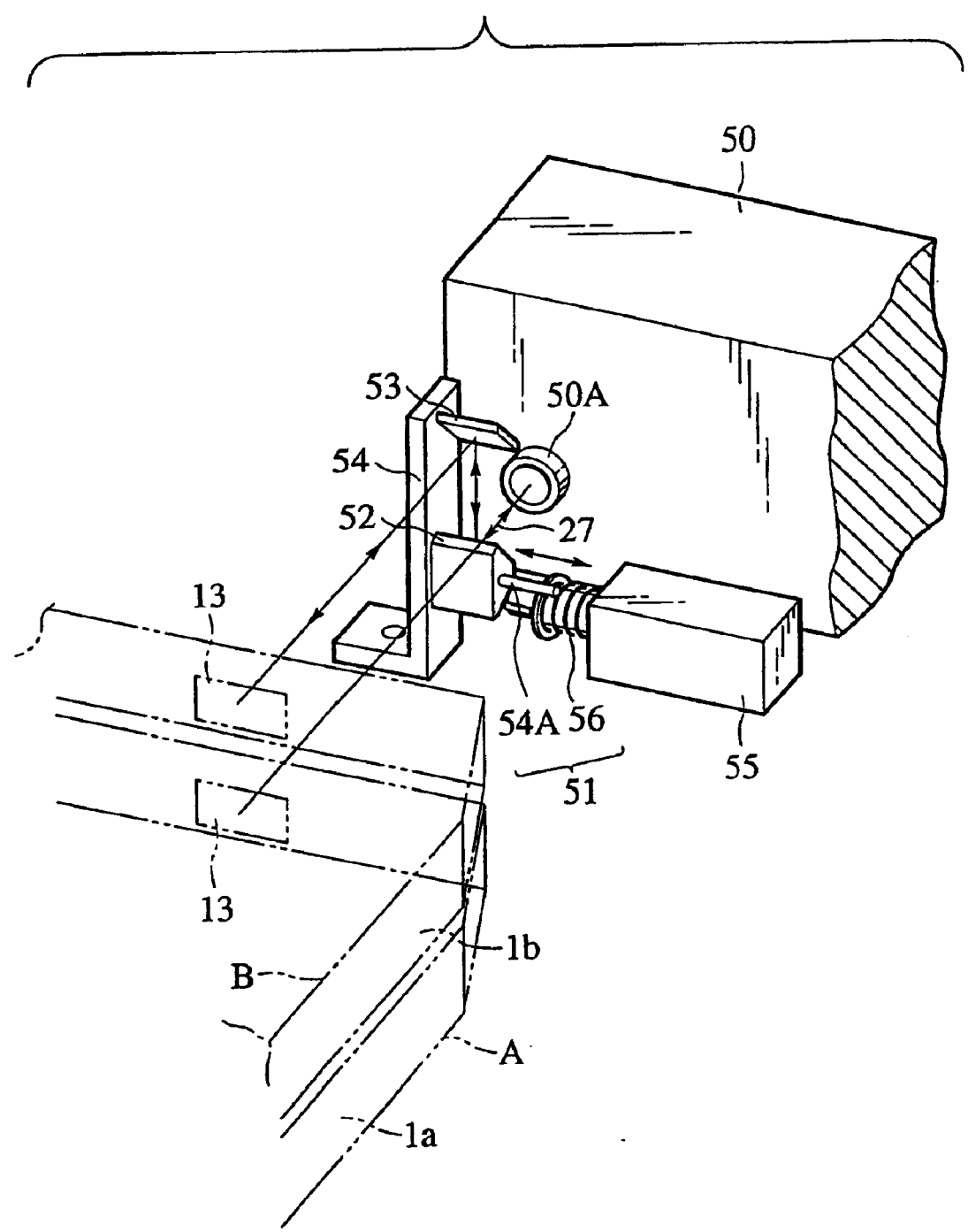
FIG. 7 is a perspective view showing an optical path switching mechanism, according to the first embodiment of the present invention.

FIG. 7 is a perspective view showing the optical path switching mechanism 51 of the optical disk drive 30 according to the first embodiment. When a second disk cartridge 1b located at a position of a top stage is in a usable state, a light beam 27 is emitted from an emission port 50A on the optical assembly 50, and reflected on a first reflection mirror 52 and further reflected on a second reflection mirror 53, and then passed through an optical window 13, and incident into the second disk cartridge 1b. The second reflection mirror 53 is fixed on a support plate 54 mounted on the base plate 31 of the optical disk drive 30. The first reflection mirror 52 is slidably supported around a guide pin 54A on the support plate 54.

When the first disk cartridge 1a located at a position A of a bottom stage is in the usable state, an electromagnetic solenoid 55 is energized to thereby suck the first reflection mirror 52 and accordingly move it along the guide pin 54A. The light beam 27 emitted from the emission port 50A is straightly advanced and is inputted from the optical window 13 into the first disk cartridge 1a. When the energizing of the electromagnetic solenoid 55 is stopped, a spring 56 pushes the second reflection plate back to its original position, and the light beam 27 is led to the optical window 13 of the second disk cartridge 1b located at the position B of the top stage. In this way, the light beam 27 can be led to a specified disk cartridge among the plurality of accommodated disk cartridges 1a, 1b, . . . .

Figure 8:
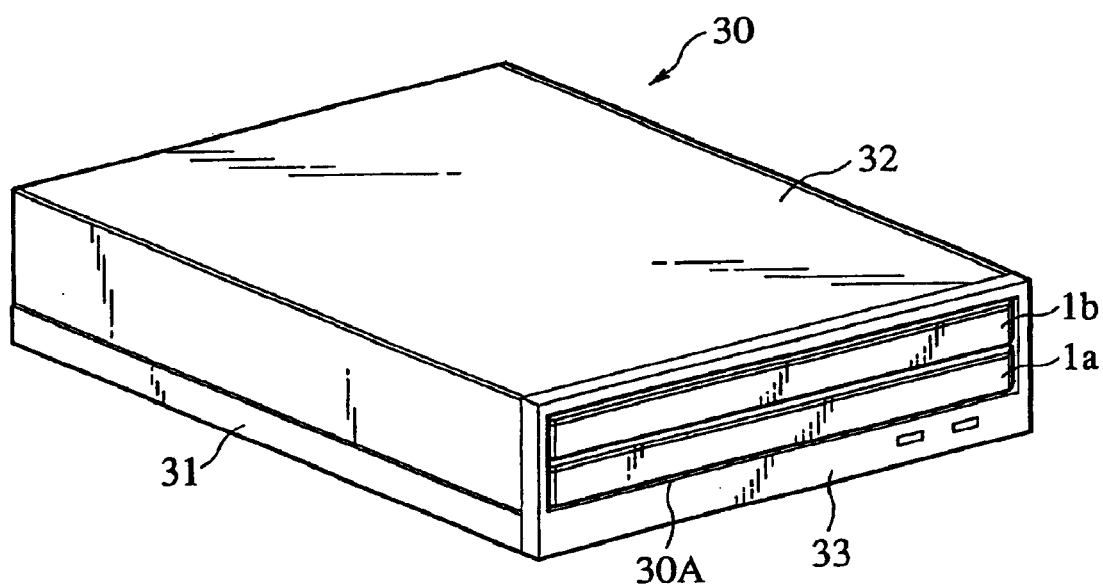
FIG. 8 is a perspective view showing a state that the disk cartridge is mounted in the optical disk drive, according to the first embodiment of the present invention.

FIG. 8 is an appearance perspective view showing a state that the disk cartridge 1a and the second disk cartridge 1b according to the first embodiment are respectively mounted in the optical disk drive 30. The optical disk drive 30 is designed such that the inner portion of the drive 30 is substantially closed by a base plate 31 and a top cover 32. Moreover, when the first disk cartridge 1a and the second disk cartridge 1b are inserted in the optical disk drive 30, an opening 30A of a front panel 33 is blocked by the frames of the first disk cartridge 1a and the second disk cartridge 1b to accordingly insure the sealed structure.

As mentioned above, in the optical storage system of the present invention provided with the optical disk drive 30 and the plurality of disk cartridges 1a, 1b, . . . according to the first embodiment, the optical disk, the optical heads (21, 22, 23 and 24) and the seeking mechanism 8 are mounted in each of the plurality of disk cartridges 1a, 1b, . . . The optical assembly 50 requiring high cost is mounted in the optical disk drive 30. Then, the optical system is divided into the optical disk drive 30 and the plurality of disk cartridges 1a, 1b, . . . , considering the cost and size (volume) of the constituent elements. Accordingly, the configuration of the plurality of disk cartridges 1a, 1b, . . . is simplified to thereby attain low cost cartridges.

Moreover, the spindle motor is mounted in each of the plurality of disk cartridges 1a, 1b, . . . . Thus, it is possible to remove the chucking mechanism of the optical disk when they are mounted in the optical disk drive 30, and also possible to easily accommodate the plurality of disk cartridges 1a, 1b, . . . in the optical disk drive 30. Hence, even a single optical disk drive 30 can cope with miscellaneous services with regard to the operations of recording and reproducing information. The miscellaneous services may include storing a frequently used program, keeping large-scale information. The backup of a recorded program and information, and the like are also implemented by the single optical disk drive 30.

Also, each of the plurality of disk cartridges 1a, 1b, . . . has the hermetically sealed structure. Thus, the optical disk and the optical heads (21, 22, 23 and 24) can be protected from the dust in ambient air and the like. Moreover, it is possible to insure the excellent reliability of the optical storage system, and also possible to provide the configuration suitable for the large storage capacity system which will be required by the technical innovation in future.

(Second Embodiment)

Figure 9:
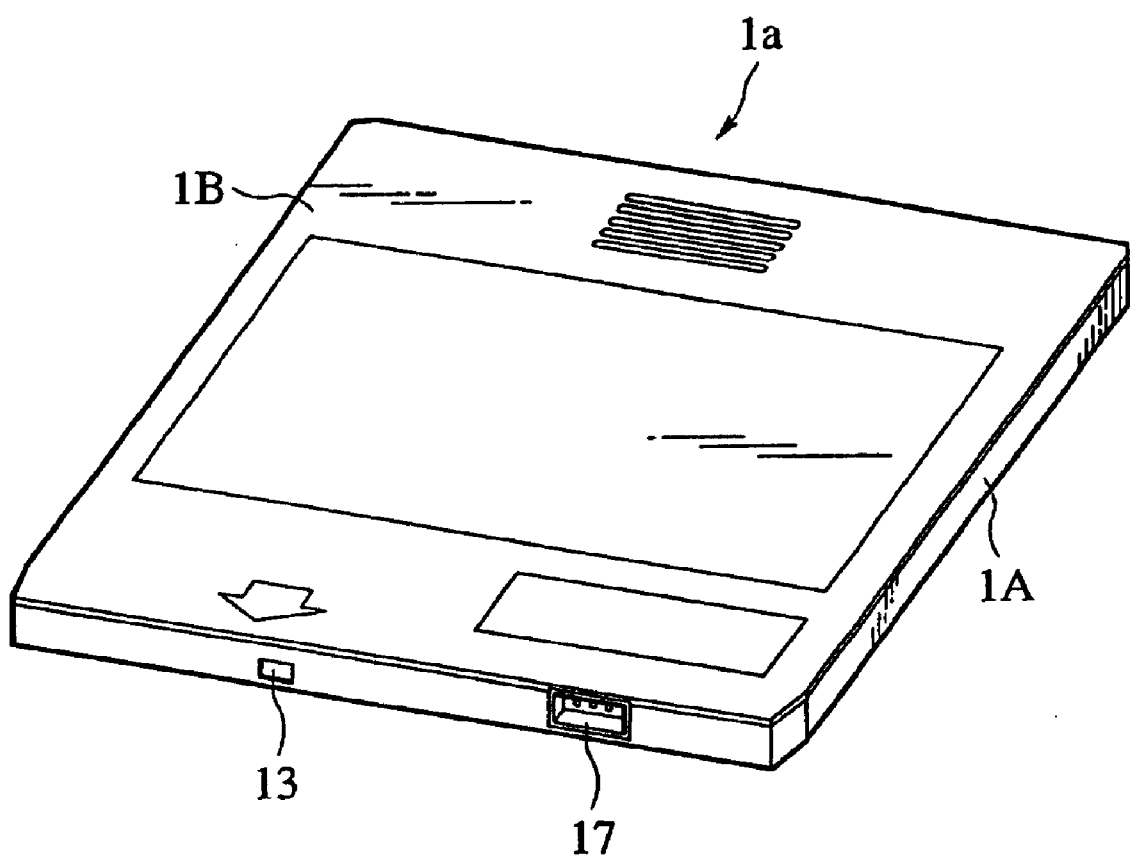
FIG. 9 is a perspective view showing a disk cartridge according to a second embodiment of the present invention.

FIG. 9 is a perspective view showing the appearance of a disk cartridge 1a used in an optical storage system according to a second embodiment of the present invention. As described later, the optical storage system according to the second embodiment is provided with an optical library and a plurality of disk cartridges accommodated therein. The inner structure of each of the plurality of disk cartridges according to the second embodiment is substantially similar to those of FIGS. 1 to 3 and FIG. 6. Thus, the duplicate explanations are omitted.

FIG. 9 shows the structure of the first disk cartridge 1a as the representation of the plurality of disk cartridges. It will be evident that the other disk cartridges have the substantially same structure. That is, in the disk cartridge 1a, the joint portion around a bottom cover 1A and a top cover 1B of a frame is adhered and fixed without gap by using the ultrasonic welding and the like, and the inner portion of the first disk cartridge 1a is hermetically sealed. An optical window 13 mounted in the bottom cover 1A of the frame is made of transparent material, such as plastic or glass in a form of plate. The transparent member of the optical window 13 blocks an opening so that only light can be transmitted. A cartridge-side-connector 17, is mounted on a front side with respect to an insertion direction of the first disk cartridge 1a into an optical library 90. Then, after the insertion of the first disk cartridge 1a into the optical library, the cartridge-side-connector 17, is automatically fitted into and electrically joined to a library-side-connector mounted in the optical library.

Figure 10:
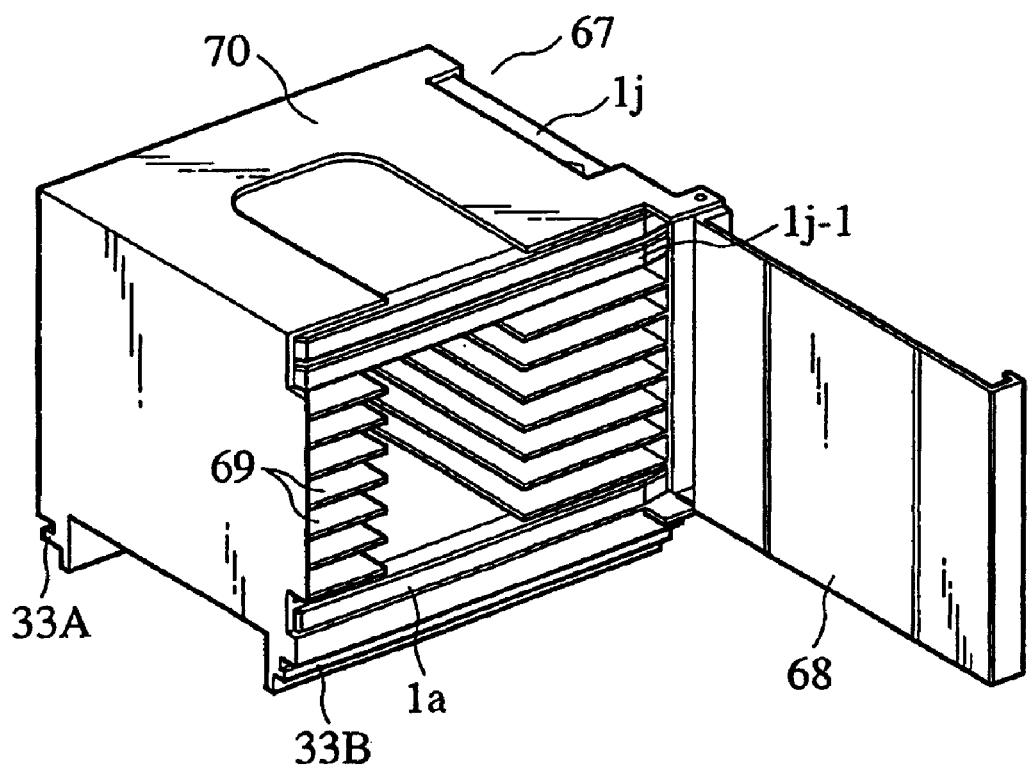
FIG. 10 is a perspective view showing a disk cartridge accommodation rack according to the second embodiment of the present invention.
Figure 11:
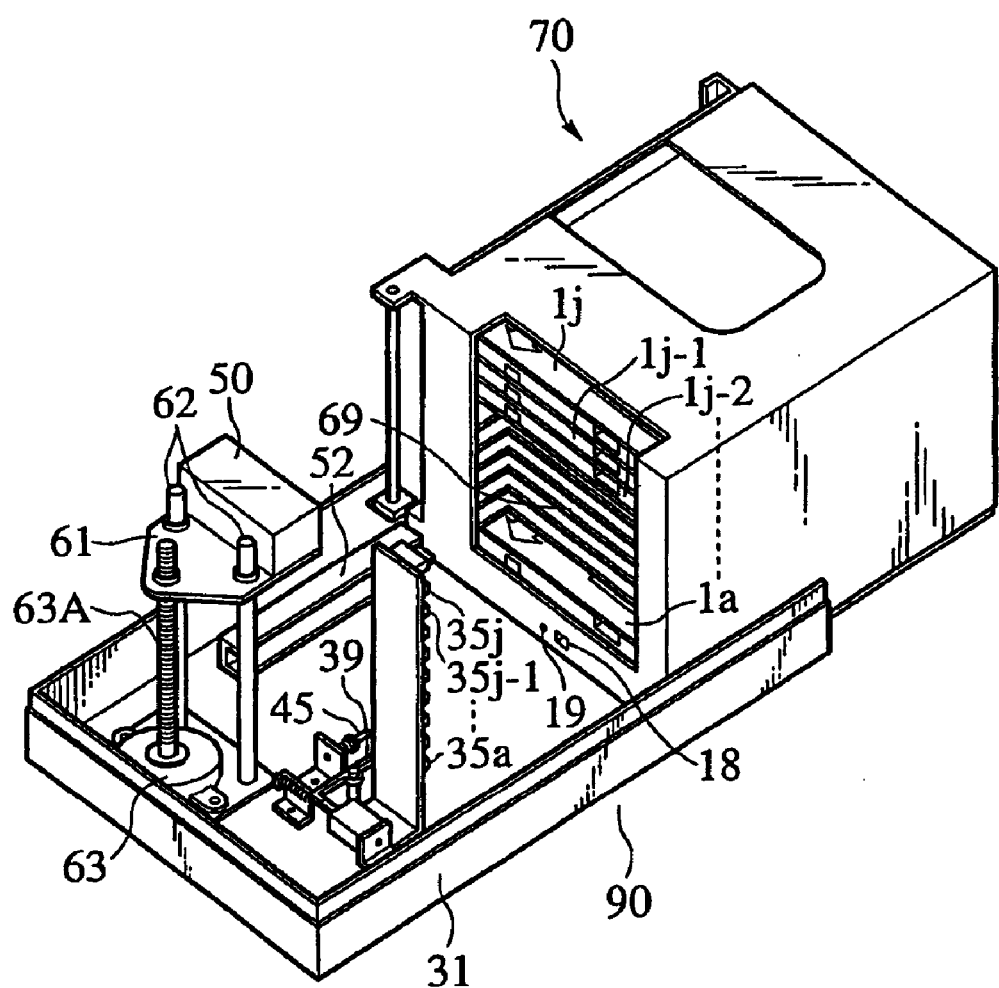
FIG. 11 is a perspective view showing an optical library according to the second embodiment of the present invention.

FIG. 10 is a perspective view showing the cartridge accommodation box 70 of the optical library according to the second embodiment. The plurality of disk cartridges 1a, . . . , 1j−1, 1j are accommodated in a plurality of accommodation racks 69 mounted in the cartridge accommodation box 70, and held on the respective accommodation racks when a door 68 is closed. A part of the frame of the cartridge accommodation box 70 is guided, through rail-shaped guide portions 33A, 33B, to a guide member (not shown) within the optical library 90, and then led to a predetermined position within the optical library 90 as shown in FIG. 11. As shown in FIG. 10, the cartridge accommodation box 70 has an opening 67 for exposing cartridge-side-connectors 17 and optical windows 13 constituted by transparent members, both mounted in each of the plurality of disk cartridges 1a, . . . , 1j−1, 1j (See FIG. 9). Thus, the electrical connection and the transmission of the light beam 27 are never obstructed within the optical library 90.

FIG. 11 is a perspective view showing the configuration of the optical library 90 according to the second embodiment, and shows a state that a top cover (not shown) of the optical library 90 is detached. That is, the optical library 90 has the plurality, of accommodation racks 69 for accommodating a plurality of disk cartridges 1a, . . . , 1j−1, 1j; an optical assembly 50; moving mechanisms (61, 62, 63 and 63A) for moving and holding this optical assembly 50 to and in a position corresponding to any disk cartridge; a disk cartridge lock mechanism; and library-side-connectors 35a, . . . , 35j−1, 35j which are fitted into and electrically connected to respective cartridge-side-connectors of the plurality of disk cartridges 1a, . . . , 1j−1, 1j. The optical assembly 50 has optical elements necessary for generation and detection of a light beam used to record and reproduce information. The optical assembly 50 further has a mechanism for adjusting a position of the 30 light beam. The disk cartridge lock mechanism holds the disk cartridge at a predetermined position within the optical library 90 when the disk cartridge is used. And the disk cartridge lock mechanism ejects the disk cartridge outside the optical library 90, when it is not used. The cartridge accommodation box 70 is guided by a couple of guide members 52 mounted on both inner sides of a base plate 31. And the cartridge accommodation box 70 is led to a predetermined position within the optical library 90.

Similarly to the first embodiment, the disk cartridge lock mechanism of the optical library 90 according to the second embodiment is composed of: an alignment mechanism for accurately leading the disk cartridges to the predetermined position in the optical library 90; a fixing mechanism for fixing the disk cartridge into the optical library 90; a releasing mechanism; and an ejecting mechanism for ejecting the disk cartridge outside the optical library 90 and the like. The alignment mechanism is composed of the outer circumference of the frame of the cartridge and a pin 45 mounted within the optical library 90. That is, the a pin 45 is engaged with a positioning hole formed in a part of the frame of the cartridge, when the plurality of disk cartridges 1a, . . . , 1j−1, 1j are accommodated within the optical library 90. The fixing mechanism is composed of a hook-shaped lock arm 39 and a hook-shaped portion formed in the outer circumference of the frame or in a part of the frame. That is, the hook-shaped lock arm 39, urged by a spring, is fitted into the hook-shaped portion formed in the outer circumference of the frame or in a part of the frame. The releasing mechanism releases the fixing mechanism by using an electromagnetic solenoid or the like, when the disk cartridge is commanded to be ejected outside the optical library 90; and an urging mechanism constituted by an elastic member of a spring for urging so as to eject the disk cartridge outside the optical library 90 and the like. The ejecting mechanism is constituted by an elastic member of a spring so that it can eject the disk cartridge outside the optical library 90 and the like.

Or, the disk cartridge lock mechanism may have an alignment mechanism for accurately leading the cartridge accommodation box 70 to a predetermined position in the optical library 90. The alignment mechanism is accomplished with the pin 45 mounted within the optical library 90 and a positioning hole 19 formed in a part of the cartridge accommodation box 70. Namely the pin 45 is engaged with the positioning hole 19, when the cartridge accommodation box 70 is accommodated in the optical library 90. The disk cartridge lock mechanism may further have a fixing mechanism for fixing the cartridge accommodation box 70 within the optical library 90, a releasing mechanism and a ejecting mechanism configured to eject the cartridge accommodation box 70 outside the optical library 90. The fixing mechanism fixes the cartridge accommodation box 70 within the optical library 90 by using the hook-shaped lock arm 39 and a hook-shaped portion 18 formed in a part of the cartridge accommodation box 70 as shown in FIG. 11. That is, urged by the spring, the hook-shaped lock arm 39 is engaged with the hook-shaped portion 18 formed in the cartridge 10 accommodation box 70. The releasing mechanism releases this fixing mechanism by using the electromagnetic solenoid or the like, when the disk cartridge accommodation box 70 is commanded to be ejected outside the optical library 90. The ejecting mechanism may be made of an elastic member such as a spring.

The optical assembly 50 is composed of, for example, the semiconductor laser diode for generating the light beam; the beam splitter for splitting the light beam; the collimator lens for modifying the shape of the light beam; the photo diode for detecting the deviation of the position of the light beam returning from the surface of the optical disk; the fine actuator for driving the corresponding optical element in order to finely adjust the position of the light beam emitted from the optical assembly 50; and the like. Mounting the fine actuator in the frame of the optical assembly 50 and precisely adjusting the entire position of the optical assembly 50 may implement the fine adjustment of the position of the light beam.

In the optical library 90 according to the second embodiment, the optical disk, the optical head and the seeking mechanism are mounted in each of the plurality of disk cartridges 1a, . . . , 1j−1, 1j, and the optical assembly 50 is mounted in the optical library 90. Accordingly, the optical system is divided into two sides. For this reason, each of the plurality of disk cartridges 1a, . . . , 1j−1, 1j can have the hermetically sealed structure so that the optical disk and the optical head can be protected from the dust in ambient air and the like. Moreover, it is possible to insure the excellent reliability of the optical storage system and also possible to provide the configuration suitable for the large storage capacity system which will be required by the technical innovation in future. Also, in the optical library 90 according to the second embodiment, the spindle motor is further mounted in each of the plurality of disk cartridges 1a, . . . , 1j−1, 1j to thereby enable the removal of each chucking mechanism of the plurality of disk cartridges 1a, . . . , 1j−1, 1j within the optical library 90. Hence, a large number of disk cartridges 1a, . . . , 1j−1, 1j can be accommodated in the small optical library 90. Moreover, it is possible to provide a memory suitable for the service of recording, reproducing or keeping large-scale image information.

(Third Embodiment)

An optical storage system according to a third embodiment of the present invention provides the structure suitable for a computer, an image information memory and the like in which great importance is placed on portability. The optical storage system according to the third embodiment of the present invention is provided with an optical disk drive and a disk cartridge accommodated therein. At first, the disk cartridge is described.

Figure 12:
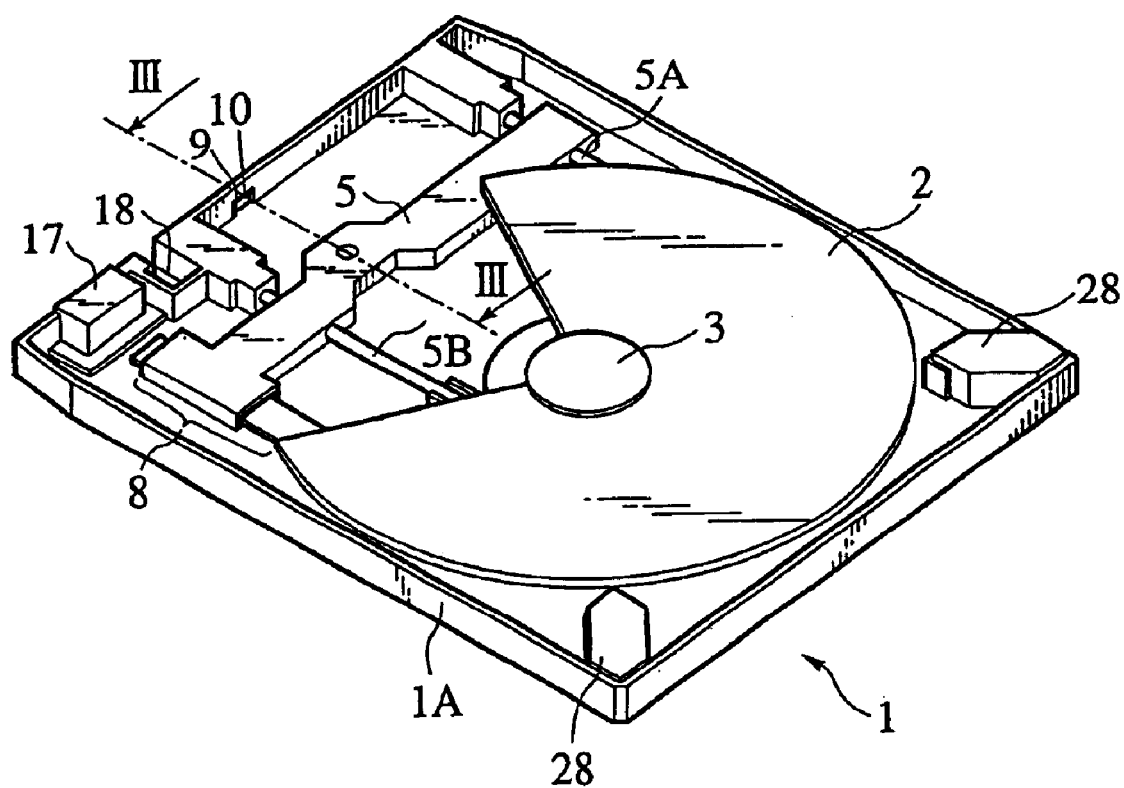
FIG. 12 is a perspective view showing a disk cartridge according to a third embodiment of the present invention.

FIG. 12 is a perspective view showing the inner configuration of a disk cartridge 1 according to the third embodiment of the present invention, and shows a state that a top cover (not shown) of a frame is detached. The inner portion of the disk cartridge is configured such that it can be hermetically sealed when the top cover is attached. An optical disk 2 is shown in a condition that a part thereof is cut away for the purpose of illustration, and fixed on a rotor of a spindle motor 3 mounted on a bottom cover 1A of the frame. A central shaft of the spindle motor 3 is fixed to the bottom cover 1A of the frame. An optical head assembly 5 is supported by guide members 5A, 5B fixed on the bottom cover 1A of the frame in a condition that the optical head assembly 5 could be straightly moved. And the optical head assembly 5 is driven by a seeking mechanism 8 of a linear actuator composed of a piezoelectric element, a back plate and an urge spring. A cartridge-side-connector 17, is electrically connected to the spindle motor 3 and the linear actuator of the seeking mechanism 8 through a printed circuit substrate (not shown). A capsular notch 18 is formed on the bottom cover 1A of the frame, and functions as a part of a disk cartridge lock mechanism. A light beam 27 is transmitted through a transparent member 10 mounted so as to block an optical window 13 on the bottom cover 1A of the frame, and inputted into the disk cartridge 1. Moreover, the light beam 27 reflected on the surface of the optical disk is passed through the same route and emitted outside the disk cartridge 1. A filter 28 is mounted in order to catch the micro dust remaining on respective parts when the optical storage system is manufactured, or the oil mist generated from the bearings of the spindle motor and the seeking mechanism 8, the vapor, the bacteria or other particles and then maintain the clean degree within the disk cartridge 1 for a long period. The filter 28 is the element in a form of cloth or net which is made of, for example, natural fiber, synthetic fiber and the like and contains active carbon, ceramic, adhesive material, or made of dielectric material electrified with positive or negative charges.

Figure 13:
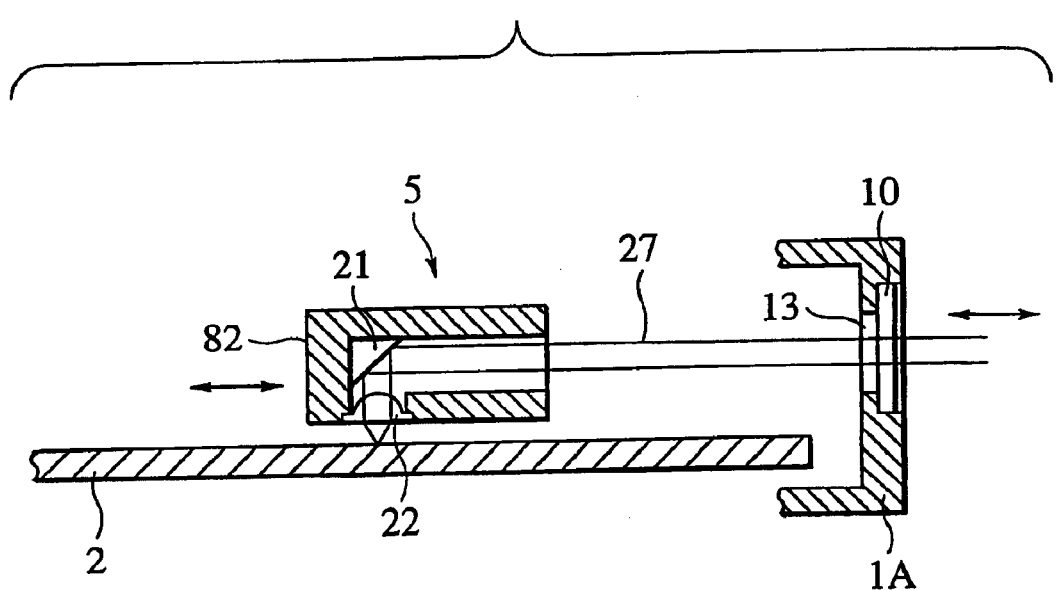
FIG. 13 is a cross sectional view of an optical disk and an optical head assembly taken along line III—III of FIG. 12.

FIG. 13 is a cross sectional view showing the optical disk 2 and the optical head assembly 5 in the disk cartridge 1 according to the third embodiment. Optical heads (21, 22) are provided with an objective lens 22, a reflection mirror 21 and a hollow frame (head unit) 82 for accommodating them. That is, the reflection mirror 21 is mounted within the head unit 82 mounted in an end of an arm 20 on the optical head assembly 5. The reflection mirror 21 reflects the light beam 27 passed through the optical window 13, and guides it to the objective lens 22. The head unit 82 is driven along the straight line. The optical disk 2 is compressed by a pushing plate and fixed on the rotor. The head unit 82 in which the objective lens 22 is built is located between the reflection mirror 21 and the optical disk 2, and moved on the surface when the optical disk 2 is rotated, while a certain gap between several μm and about 1 mm is kept from the surface of the optical disk. The light beam 27 transmitted through the transparent material 10 mounted in the optical window 13 on the bottom cover 1A of the frame is reflected on the reflection mirror 21 within the head unit 82, and passed through the objective lens 22, and then converged onto information storage medium formed on the surface of the optical disk 2. Moreover, the light beam 27 reflected on the storage medium is passed through the same route and emitted outside the disk cartridge 1. Similarly to the first embodiment, the optical head in the third embodiment may be composed of: the slider which slides while maintaining the minute gap equal to or less than several μm from the surface of the optical disk, associated with the rotation of the optical disk 2, or is always in contact with the surface of the optical disk; the optical head mounted on this slider or the optical stylus in a form of needle made of glass fiber and the like; the reflection mirror mounted in the vicinity of this slider; the elastic member for applying a certain pushing force against the surface of the optical disk to this slider; and the arm for supporting this elastic member and this reflection mirror. Also, similarly to the first embodiment, in order to easily guide the light beam incident from the optical window 13 to the optical head, the light guide member constituted by the combination of the glass fiber having the high transparency, the plastic fiber and the optical element for reflecting or refracting the light and the like may be mounted between the vicinity of the optical window 13 and the optical disk.

Figure 14:
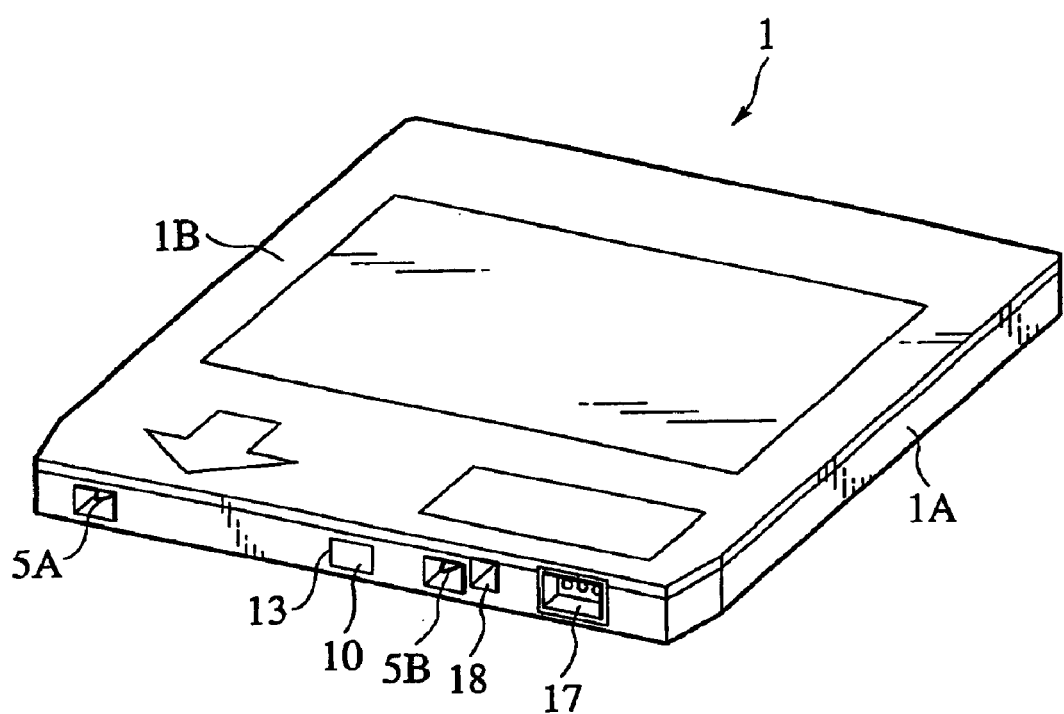
FIG. 14 is a perspective view showing a disk cartridge according to the third embodiment of the present invention.

FIG. 14 is a perspective view showing the appearance of the disk cartridge 1 according to the third embodiment. In the bottom cover 1A and the top cover 1B of the frame, the joint surface around them is adhered and fixed without gap by using the ultrasonic welding and the like, and the inner portion of the disk cartridge 1 is hermetically sealed. In the optical window 13 mounted in the bottom cover 1A of the frame, an opening is blocked by the transparent member 10, such as plastic or glass in a form of plate so that only light can be transmitted. The cartridge-side-connector 17, is mounted on the front side with respect to the insertion direction of the disk cartridge 1 into the optical disk drive 30 shown in FIG. 15. Then, after the completion of the insertion of the disk cartridge 1, the cartridge-side-connector 17, is automatically fitted into and electrically joined to a drive-side-connector 35 (See FIG. 15) mounted in the optical disk drive 30. Similarly, the guide members 5A, 5B (See FIG. 12) for the optical head assembly 5 exposed on the front side and the capsular notch 18 mounted on the same side are scheduled respectively to be fitted into members mounted in the optical disk drive 30 shown in FIG. 15. That is, the disk cartridge lock mechanism for holding the disk cartridge 1 at a predetermined position within the optical disk drive 30 is constructed by the cartridge-side-connector 17 and the capsular notch 18.

Figure 15:
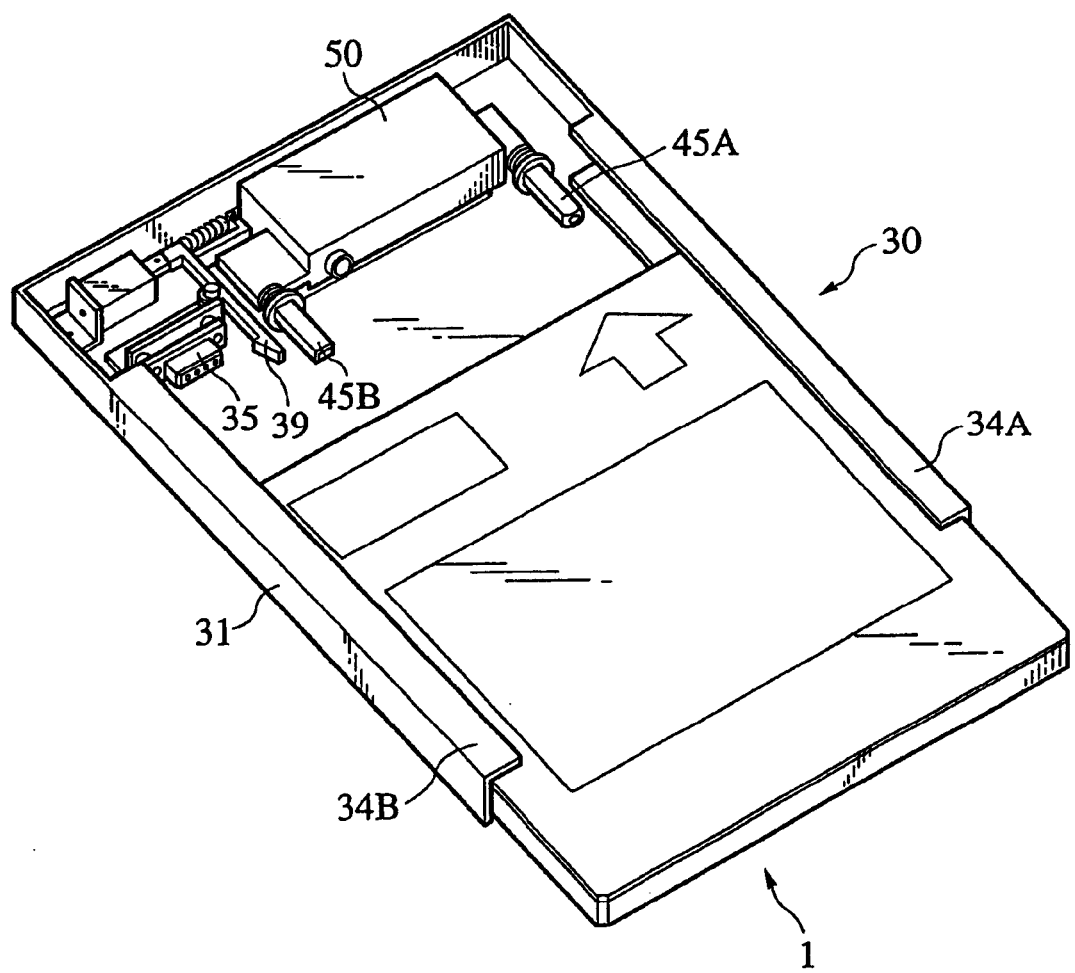
FIG. 15 is a perspective view showing an optical disk drive according to the third embodiment of the present invention.

FIG. 15 is a perspective view showing the configuration of the optical disk drive 30 according to the third embodiment of the present invention, and shows a state that a top cover (not shown) of the optical disk drive 30 is detached.

The disk cartridge 1, when inserted into the optical disk drive 30, is guided by the disk cartridge guide members 34A, 34B, and is led to a predetermined position within the optical disk drive 30. The disk cartridge guide members 34A, 34B are formed in a form of slider, and are mounted in both inner sides of the base plate 31. A drive-side-connector 35, a lock arm 39 and positioning pins 45A, 45B are mounted in the optical disk drive 30 according to the third embodiment. Moreover, an optical assembly 50 is mounted for accommodating optical elements necessary for generation and detection of the light beam and a mechanism for adjusting a position of the light beam 27.

Figure 16:
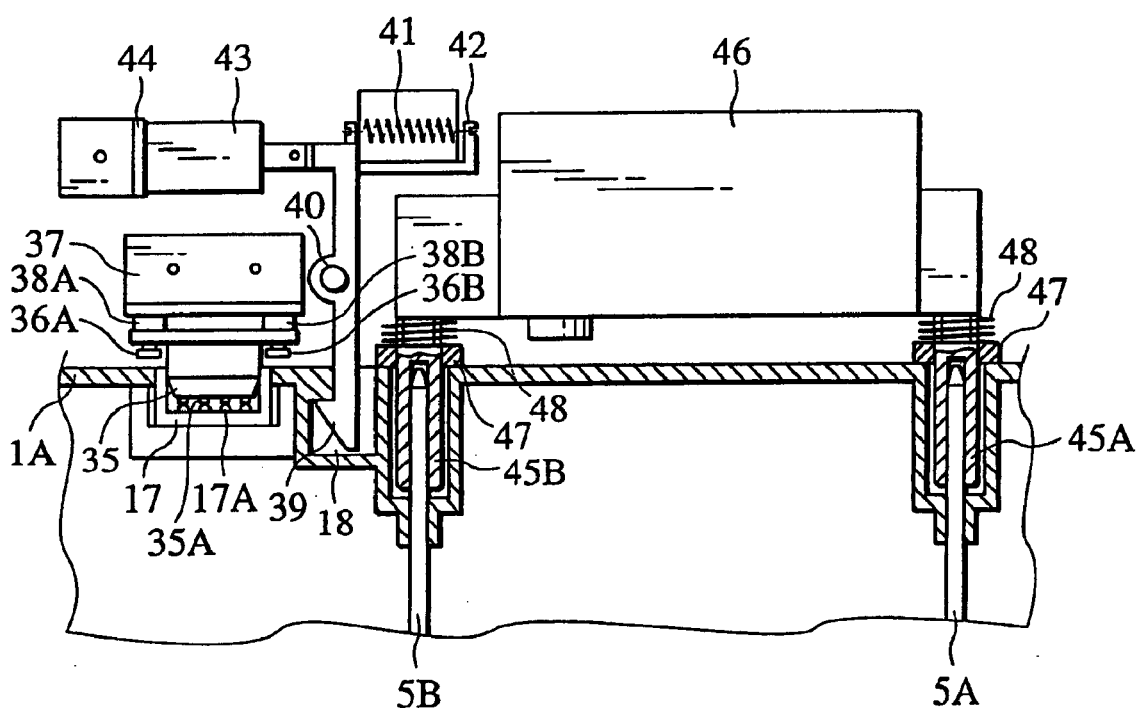
FIG. 16 is a partially cross sectional view showing a disk cartridge lock mechanism and a connector according to the third embodiment of the present invention.

FIG. 16 is a partially cross sectional view to explain the actions of the disk cartridge lock mechanism and the connectors. When the insertion of the disk cartridge 1 into the optical disk drive 30 is completed, the drive-side-connector 35 within the optical disk drive 30 is fitted into the cartridge-side-connector 17, mounted in the bottom cover 1A of the frame. Accordingly, respective contacts 17A, 35A are in contact with each other to thereby establish the electrical connection. The drive-side-connector 35 is slidably supported through sliding shafts 36A, 36B, and the sliding shafts 36A, 36B are attached to a support plate 37 mounted on the base plate 31 of the optical disk drive 30. In order to smooth the engaging operation between the connectors, proper play is provided in the sliding portions of the drive-side-connector 35 and the sliding shafts 36A, 36B. Moreover, in order to absorb the shock caused by the insertion of the disk cartridge 1, dampers 38A, 38B made of elastic material are mounted between the drive-side-connector 35 and the support plate 37. In this way, in order to reduce the shock or the mechanical abrasion caused by the insertion of the disk cartridge 1, it is desirable that the drive-side-connector 35 within the optical disk drive 30 connected to the cartridge-side-connector 17, is held by a holding member under a certain free degree. An arm shaft 40 rotatably supports a lock arm 39. A tip on the side of the disk cartridge 1 is hook-shaped. The other end is urged to one direction by a spring 41, and stopped at a predetermined position by a stopper 42. Moreover, it is sucked by an electromagnetic solenoid 43 to a direction opposite to the urge direction of the spring 41. The electromagnetic solenoid 43 is fixed to a support plate 44 mounted on the base plate 31 of the 10 optical disk drive 30. When the disk cartridge 1 is inserted, the lock arm 39 is guided to an inclination portion of the hook-shaped portion of its tip, and rotated oppositely to the urge direction of the spring 41. When the insertion operation is ended, the hook-shaped portion is fitted into the capsular notch 18, and it returns back to the original position. The positioning pins 45a, 45b are fixed to a support plate 46 integrated with the frame of the optical assembly 50. When the disk cartridge 1 is inserted, the positioning pins 45a, 45b are engaged with a part of the guide members 5A, 5B for the optical head assembly 5, the tips of the guide members 5A, 5B are exposed outside the disk cartridge 1, and guides the disk cartridge 1 to a predetermined position, and then sets its position. Ejectors 47 are slidably supported around the positioning pins 45a, 45B, and similarly urged by springs 48 mounted in the positioning pins 45A, 45B. When the disk cartridge 1 is ejected outside the optical disk drive 30, the electromagnetic solenoid 43 is energized to thereby suck the end of the lock arm 39. The lock arm 39 is rotated by a predetermined angle to accordingly release the hook-shaped portion at the other end, from the capsular notch 18. The disk cartridge 1 released from the lock state is pushed outside the optical disk drive 30 through the ejectors 47 by the urge force of the springs 48.

Figure 17:
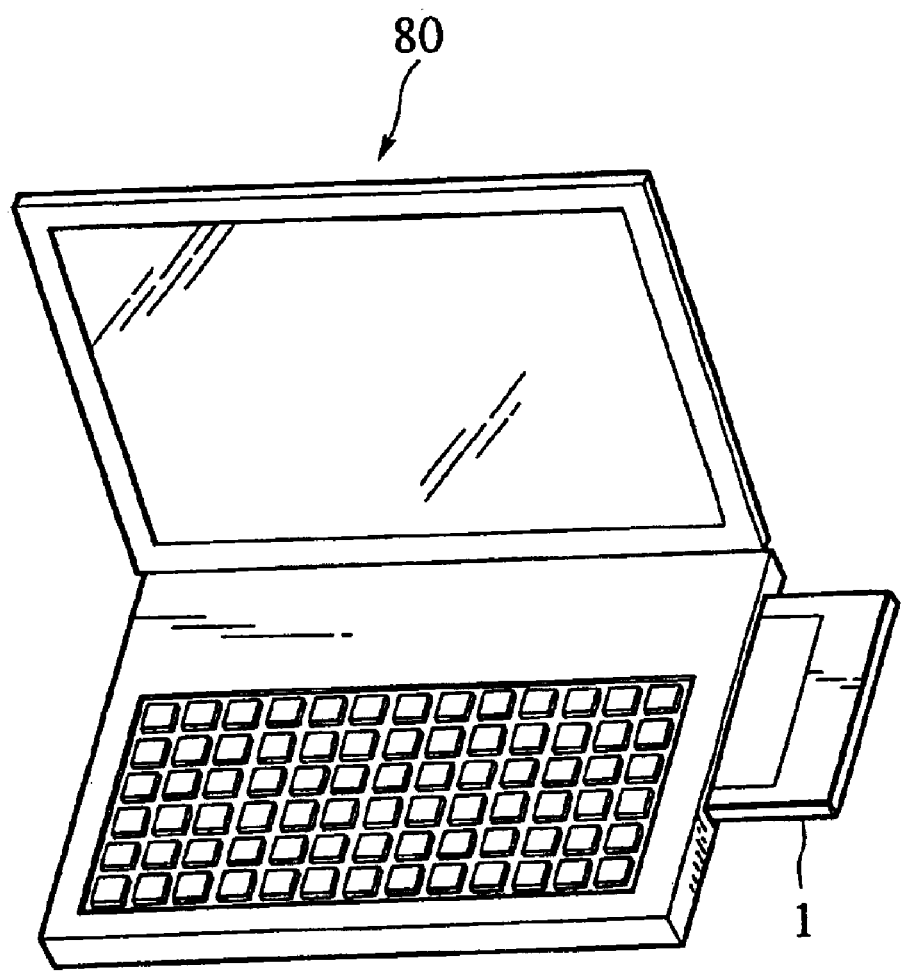
FIG. 17 is a perspective view showing a state that the disk cartridge is mounted in a computer according to the third embodiment of the present invention.

FIG. 17 is an appearance perspective view showing a state that the disk cartridge 1 is mounted in a computer 80 in which the optical disk drive 30 is mounted so as to construct the optical storage system of the present invention. The disk cartridge 1 contains the spindle motor and the seeking mechanism 8 as already shown in FIG. 12. Thus, only the insertion of a part of the disk cartridge 1 into the computer enables it to be in a usable state in the optical storage system. As mentioned above, in the optical storage system according to the third embodiment of the present invention, the optical disk 2, the optical head assembly 5 and the seeking mechanism 8 are mounted in the disk cartridge 1 as shown in FIG. 12. On the other hand, the optical assembly 50 requiring high cost is mounted in the optical disk drive 30 as shown in FIG. 15. Then, the optical system is divided into the disk cartridge 1 and the optical disk drive 30. Accordingly, the configuration of the disk cartridge 1 is simplified to thereby attain low cost cartridges. Moreover, mounting the spindle motor 3 in the disk cartridge 1 can remove the chucking mechanism of the optical disk when it is mounted in the optical disk drive 30. Also, the disk cartridge 1 has the hermetically sealed structure. Hence, the optical disk 2 and the optical head assembly 5, which includes the optical heads (21, 22), can be protected from the dust in ambient air and the like. Moreover, it is possible to insure the excellent reliability of the optical storage system and also possible to provide the configuration suitable for the large storage capacity system which will be required by the technical innovation in future. Also, it can be used only by inserting a part of the disk cartridge 1 into the optical disk drive 30. Therefore, it is possible to provide the information storage media suitable for a small note type computer, an image information storage apparatus such as a video camera and the like in which great importance is placed on portability.

Various modifications will become possible for those skilled in the art after receiving the teachings of the present disclosure without departing from scope thereof.

What is claimed is:

1. An optical library comprising:
   an accommodation rack for accommodating a plurality of disk cartridges;
   an optical assembly having:
      optical elements necessary for a generation and a detection of a light beam used to record and reproduce information, and
      a mechanism for adjusting a position of the light beam;
   a moving mechanism configured to move to a position corresponding to one of the disk cartridges;
   a disk cartridge lock mechanism configured to hold the disk cartridges at a predetermined position within the optical library, and to eject the disk cartridges outside the optical library; and
   a library-side-connector configured to be fitted into and electrically connected to a cartridge-side-connector on one of the disk cartridges,
   wherein said disk cartridge accommodation rack is configured such that it can be mounted in and detached from the optical library and a part of a frame of said disk cartridge accommodation rack is configured such that it is fitted into said disk cartridge lock mechanism.

2. An optical storage system comprising:
   (a) a plurality of disk cartridges, each comprising:
      a frame having a hermetically sealed structure;
      an optical disk mounted in the frame;
      a spindle motor for holding the optical disk rotatable;
      an optical head assembly having:
         an optical head accessing a surface of said optical disk, and
         a seeking mechanism for positioning the optical head at a specified track on said optical disk;
      a cartridge-side-connector disposed on said frame; and
      an optical window mounted on said frame, and
   (b) an optical library comprising:
      an accommodation rack for respectively accommodating said plurality of disk cartridges;
      an optical assembly having:
         optical elements for a generation and a detection of a light beam used to record and reproduce information, and
         a mechanism for adjusting a position of the light beam;
      a moving mechanism for moving and holding the optical assembly to and at a position corresponding to one of said disk cartridges;
      disk cartridge lock mechanisms holding said disk cartridges at predetermined positions within said optical library, and ejecting said disk cartridges outside said optical library; and
      library-side-connectors, each being fitted into and electrically connected to said cartridge-side-connector.

3. The optical storage system of claim 2, wherein each of said frames of said disk cartridges further comprises a structure that a part of said frame is fitted into one of the disk cartridge lock mechanisms.

4. The optical storage system of claim 2, wherein each of said disk cartridges further comprises a filter member for catching particles comprising one of dust, oil mist, vapor and bacteria.

* * * * *